(12) United States Patent
Matsumoto et al.

(10) Patent No.: US 8,925,508 B2
(45) Date of Patent: Jan. 6, 2015

(54) LINEAR SOLENOID

(71) Applicant: Denso Corporation, Kariya, Aichi-pref. (JP)

(72) Inventors: Koichiro Matsumoto, Nagoya (JP); Yoshiyuki Murao, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/954,171

(22) Filed: Jul. 30, 2013

(65) Prior Publication Data

US 2014/0026836 A1    Jan. 30, 2014

(30) Foreign Application Priority Data

Jul. 30, 2012 (JP) ................. 2012-168205
Dec. 19, 2012 (JP) ................. 2012-276815

(51) Int. Cl.
- *F01L 1/34* (2006.01)
- *H02K 41/02* (2006.01)
- *H01F 7/16* (2006.01)

(52) U.S. Cl.
CPC . *H02K 41/02* (2013.01); *H01F 7/16* (2013.01)
USPC ................... 123/90.17; 123/90.15

(58) Field of Classification Search
USPC ................. 123/90.15, 90.17, 90.31
See application file for complete search history.

(56) References Cited

U.S. PATENT DOCUMENTS

| 5,659,246 | A |   | 8/1997 | Togo et al. |
| 5,689,182 | A |   | 11/1997 | Togo et al. |
| 6,076,550 | A | * | 6/2000 | Hiraishi et al. ............ 137/550 |
| 6,118,361 | A |   | 9/2000 | Ogawa |
| 2011/0248805 | A1 |   | 10/2011 | Hamaoka et al. |
| 2012/0242436 | A1 |   | 9/2012 | Murao |

FOREIGN PATENT DOCUMENTS

| JP | 07-037718 | 2/1995 |
| JP | 09-063835 | 3/1997 |
| JP | 11-307341 | 11/1999 |
| JP | 2002-134316 | 5/2002 |
| JP | 2005-005652 | 1/2005 |
| JP | 2007-115835 | 5/2007 |
| JP | 2012-047283 | 3/2012 |

OTHER PUBLICATIONS

Office Action (2 pages) dated May 1, 2014 issued in corresponding Japanese Application No. 2012-168205 and English translation (2 pages).
Matsumoto, et al., U.S. Appl. No. 13/954,163, filed Jul. 30, 2013.
Matsumoto, et al., U.S. Appl. No. 13/954,167, filed Jul. 30, 2013.
Office Action (2 pages) dated Nov. 4, 2014, issued in corresponding Japanese Application No. 2012-276815 and English translation (2 pages).

* cited by examiner

*Primary Examiner* — Zelalem Eshete
(74) *Attorney, Agent, or Firm* — Nixon & Vanderhye PC

(57) ABSTRACT

A housing is molded from a resin material, and a first flange portion of the bobbin forms a fusing protrusion, which is joined and fused with the housing. The housing includes through-holes, which are located on a radially inner side of the fusing protrusion and extends through a portion of the housing in the axial direction. A yoke includes at least one pressure reducing part, which is configured to reduce a pressure exerted to a projection of the bobbin by a flow of the resin material at a time of molding the housing.

10 Claims, 23 Drawing Sheets

LINEAR SOLENOID

CROSS REFERENCE TO RELATED APPLICATION

This application is based on and incorporates herein by reference Japanese Patent Application No. 2012-168205 filed on Jul. 30, 2012 and Japanese Patent Application No. 2012-276815 filed on Dec. 19, 2012.

TECHNICAL FIELD

The present disclosure relates to a linear solenoid.

BACKGROUND

A known linear solenoid linearly drives a movable core through use of a magnetic field that is generated upon energization of a coil of a stator. For example, JP2011-222799A (US2011/0248805A1) discloses a linear solenoid, which includes a coil and a bobbin. An outer peripheral part of the coil and an outer peripheral part of the bobbin are resin molded. The coil and the bobbin are held between two yokes together with the first stationary core and the second stationary core. The bobbin includes a winding portion, a first flange portion, a second flange portion and a projection. The winding portion is configured into a tubular form, and the coil is wound around the winding portion. The first flange portion is placed at one end part of the winding portion and radially outwardly extends from the one end part of the winding portion. The second flange portion is placed at the other end part of the winding portion, which is axially opposite from the one end part of the winding portion. The second flange portion radially outwardly extends from the other end part of the winding portion. The projection axially projects from the other end part of the winding portion toward a corresponding one of the yokes. An O-ring is placed between the one of the yokes and the second flange portion of the bobbin, and another O-ring is placed between the other one of the yokes and the first flange portion of the bobbin. In JP2011-222799A (US2011/0248805A1), the linear solenoid is used as a drive device of a hydraulic pressure change valve of a valve timing control apparatus of an internal combustion engine.

It is conceivable to form a fusing protrusion at the bobbin and to provide a housing that is resin molded together with the yoke, the coil and the bobbin. In such a case, the resin material of the housing is joined to and fused with the fusing protrusion of the bobbin. In this way, it is possible to eliminate the O-ring and to limit the intrusion of the oil, which is present in the inside of the linear solenoid, to the coil through the boundary surface between the housing and the bobbin. When the intrusion of the oil to the coil is limited, it is possible to limit conduction of the oil from the coil to an electronic control device through terminals connected to the coil.

However, heat of the coil, which is generated at the time of energizing the coil, tends to be kept in the inside of the molded member, so that release of the heat to the outside is not effectively carried out. When the heat is accumulated in the inside of the molded member, a resistance (electric resistance) of the coil is increased. At that time, even though the same voltage is applied to the coil, the current, which flows through the coil, becomes smaller in comparison to the previous state, which is before the occurrence of the change in the resistance of the coil. Therefore, the magnetic field, which is generated around the coil, is reduced, and thereby the magnetic attractive force, which attracts the mover, becomes smaller. In addition, when the heat is accumulated in the inside of the molded member, the molded member made of the resin material may be thermally degraded.

Furthermore, the pressure, which is exerted to the projection of the bobbin due to the flow of the resin material at the time of molding the housing, causes radially inward flexion of the projection. When the projection of the bobbin is radially inwardly flexed, a gap is formed between the bobbin and the yoke, and the molten resin material flows into this gap defined between the bobbin and the yoke to cause generation of burrs. Also, when the projection of the bobbin is radially inwardly flexed, a crack may be formed in the bobbin. The burrs may possibly be broken and may fall into sliding pats) of the linear solenoid and/or the sliding part(s) of the spool of the hydraulic pressure change valve. Also, the burrs may possibly intrude into the inside of the engine. When the crack is formed in the bobbin, the oil, which is present in the inside of the linear solenoid, may possibly be conducted from the crack to the electronic control device through the coil and the terminals to cause a damage of the electronic control device.

SUMMARY

The present disclosure is made in view of the above points. According to the present disclosure, there is provided a linear solenoid, which includes a mover, a stator, a yoke, a coil, a bobbin and a molded member. The mover is elongated in an axial direction and is configured to reciprocate in the axial direction. The stator axially slidably supports the mover. The yoke includes a tubular portion and a bottom portion. The tubular portion is located on a radially outer side of the stator and contacts one end portion of the stator. The bottom portion contacts the other end portion of the stator, which is opposite from the one end portion of the stator in the axial direction. The coil is configured into an annular shape and is placed between the tubular portion of the yoke and the stator. The bobbin includes a winding portion, a first flange portion and a second flange portion. The winding portion is configured into a tubular shape and holds the coil that is wound around the winding portion. The first flange portion is placed at one end part of the winding portion, which is opposite from the bottom portion in the axial direction. The second flange portion is placed at the other end part of the winding portion that is opposite from the one end part of the winding portion in the axial direction. The molded member is made of a resin material and holds the coil, the first flange portion and the second flange portion of the bobbin, which are insert-molded in the molded member. The first flange portion of the bobbin forms a fusing protrusion, which is joined and fused with the molded member. The molded member includes at least one through-hole, which is located on a radially inner side of the fusing protrusion and extends through a portion of the molded member in the axial direction.

According to the present disclosure, there is also provided a linear solenoid, which includes a output rod, a first stationary core, a second stationary core, a movable core, a coil, a bobbin, a first yoke, a second yoke and a housing. The first stationary core supports one end portion of the output rod. The second stationary core supports the other end portion of the output rod, which is opposite from the one end portion of the output rod in an axial direction of the output rod. An air gap is interposed between the first stationary core and the second stationary core in the axial direction. The movable core is fixed to the output rod and is configured to reciprocate in the axial direction between an initial position, which is located on a side where the second stationary core is placed, and a full stroke position, which is located on a side where the first stationary core is placed. The coil is formed into an annular form and is located on a radially outer side of the air gap. The bobbin includes a winding portion, a first flange portion, a first fusing protrusion, a second flange portion, a second fusing protrusion and a projection. The winding portion is configured into a tubular form. The coil is wound around the winding portion. The first flange portion radially outwardly extends from one end part of the winding portion. The first fusing protrusion is formed in a radially outer end part of the first flange portion. The second flange portion radially outwardly extends from the other end part of the winding portion that is opposite from the one end part of the winding portion in the axial direction. The second fusing protrusion is formed in a radially outer end part of the second flange portion. The projection projects from the winding portion in the axial direction. The first yoke is located on a radially outer side of the coil. The first yoke is configured to conduct a magnetic flux between the first yoke and the first stationary core. The second yoke is placed adjacent to the projection of the bobbin and the second stationary core on a side, which is opposite from the first stationary core in the axial direction. The second yoke magnetically couples between the first yoke and the second stationary core. The housing is molded from a resin material, which fills a radial gap and an axial gap. The radial gap is radially defined between the first yoke, which is located on a radially outer side of the radial gap, and the coil and the bobbin, which are located on a radially inner side of the radial gap. The axial gap is axially defined between the second yoke, which is located on an axially outer side of the axial gap, and the second flange portion of the bobbin, which is located on an axially inner side of the axial gap. The housing is joined and fused with the first fusing protrusion and the second fusing protrusion of the bobbin. The second yoke includes at least one pressure reducing part, which is configured to reduce a pressure exerted to the projection of the bobbin by a flow of the resin material at a time of molding the housing.

BRIEF DESCRIPTION OF THE DRAWINGS

The drawings described herein are for illustration purposes only and are not intended to limit the scope of the present disclosure in any way.

DETAILED DESCRIPTION

Figure 1:
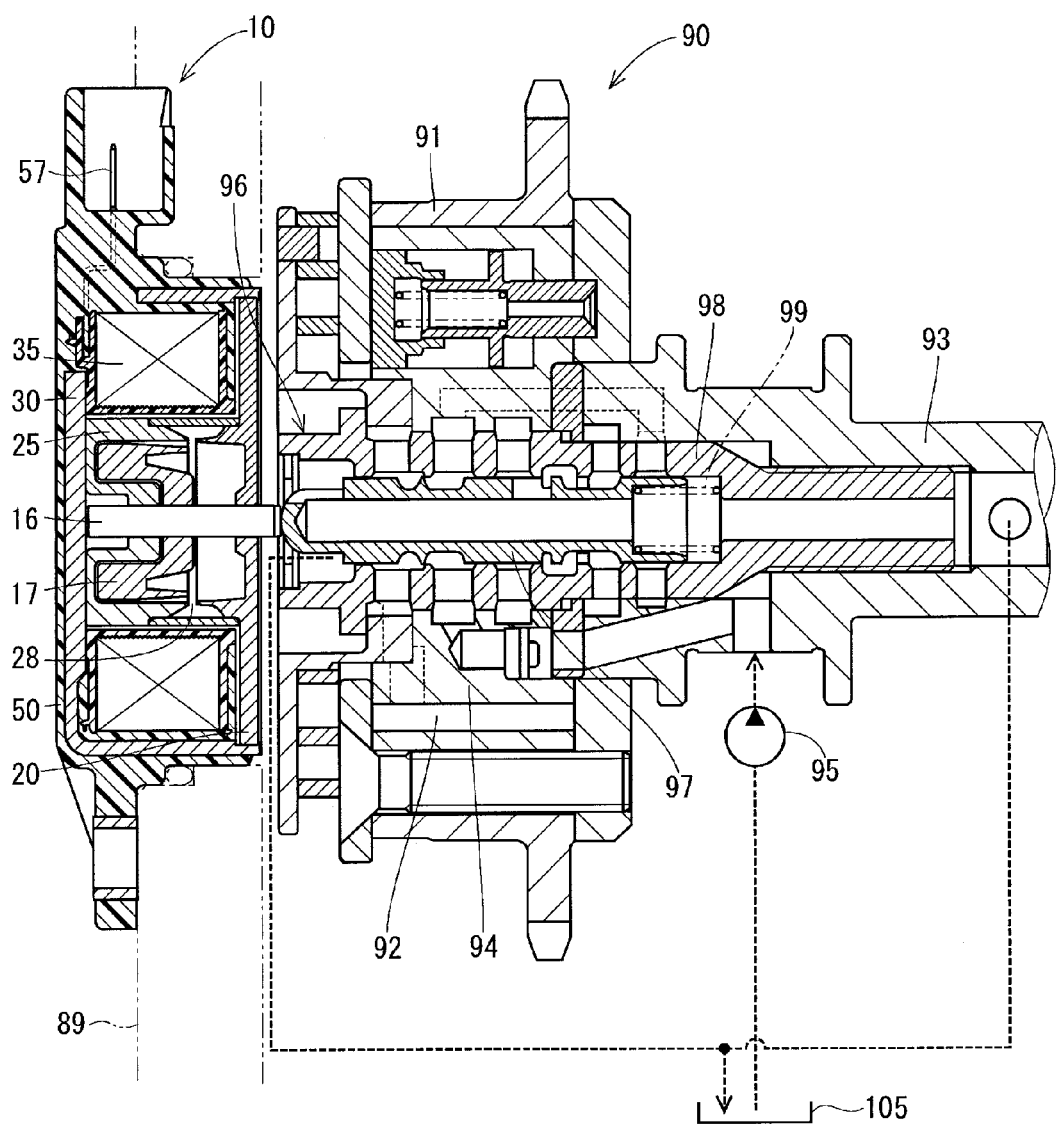
FIG. 1 is a schematic cross-sectional view of a valve timing control apparatus, in which a linear solenoid according to a first embodiment of the present disclosure is applied.

Various embodiments of the present disclosure will be described with reference to the accompanying drawings. In the following discussion of the embodiments, similar components will be indicated by the same reference numerals and will not be described redundantly for the sake of simplicity. Furthermore, any one or more components of any one or more of the following embodiments and modifications thereof may be combined with or replaced with any one or more components of another one or more of the following embodiments and modifications thereof within a principle of the present disclosure.

First Embodiment

FIG. 1 shows a valve timing control apparatus 90, which includes a linear solenoid according to a first embodiment of the present disclosure. In the valve timing control apparatus 90 of the present embodiment, hydraulic oil is supplied to a hydraulic pressure chamber 92 of a case 91 that is rotatable integrally with a crankshaft of an undepicted internal combustion engine, so that a vane rotor 94, which is rotatable integrally with a camshaft 93, is rotated relative to the case 91, and thereby opening/closing timing of each corresponding one of undepicted exhaust valves (or intake valves) is adjusted. The hydraulic oil, which is pumped from an oil pan 105 by an oil pump 95, is supplied to the hydraulic pressure chamber 92 through a hydraulic pressure change valve (also referred to as a hydraulic pressure control valve) 96. A spool 97 of the hydraulic pressure change valve 96 is received in a sleeve 98 in a manner that enables reciprocation of the spool 97 in an axial direction. The spool 97 is axially reciprocatable and is axially urged toward one side (the left side in FIG. 1) by a spring 99. The linear solenoid 10 serves as a drive device, which axially drives the spool 97 toward the other side (the right side in FIG. 1) against the urging force of the spring 99.

First of all, the structure of the linear solenoid 10 will be schematically described with reference to FIGS. 2 to 4.

The linear solenoid 10 includes a mover (also referred to as a slider) 15, a first stationary core 20, a second stationary core 25, a collar 29, a yoke 30, a coil 35, a bobbin 40 and a housing (serving as a molded member) 50.

The mover 15 is elongated in an axial direction and includes an output rod (also referred to as a shaft) 16 and a movable core 17. The movable core 17 is made of a magnetic material and is fixed to the output rod 16.

The first stationary core 20 is made of a magnetic material and includes a supporting portion 21, a flange portion 22 and an annular projection (also referred to as a first annular projection) 23. The supporting portion 21 slidably supports one end portion of the output rod 16 in a manner that enables reciprocation of the output rod 16 in the axial direction. The flange portion 22 outwardly projects from the supporting portion 21 in a radial direction. The annular projection 23 projects from the supporting portion 21 in the axial direction.

The second stationary core 25 is made of a magnetic material and includes a supporting portion 26 and an annular projection (also referred to as a second annular projection) 27. The supporting portion 26 slidably supports the other end portion of the output rod 16, which is axially opposite from the one end portion of the output rod 16, in a manner that enables reciprocation of the output rod 16 in the axial direction. The annular projection 27 axially projects toward the annular projection 23 of the first stationary core 20, and an air gap 28 is formed between the annular projection 27 and the annular projection 23. The first stationary core 20 and the second stationary core 25 form a stator.

Figure 2:
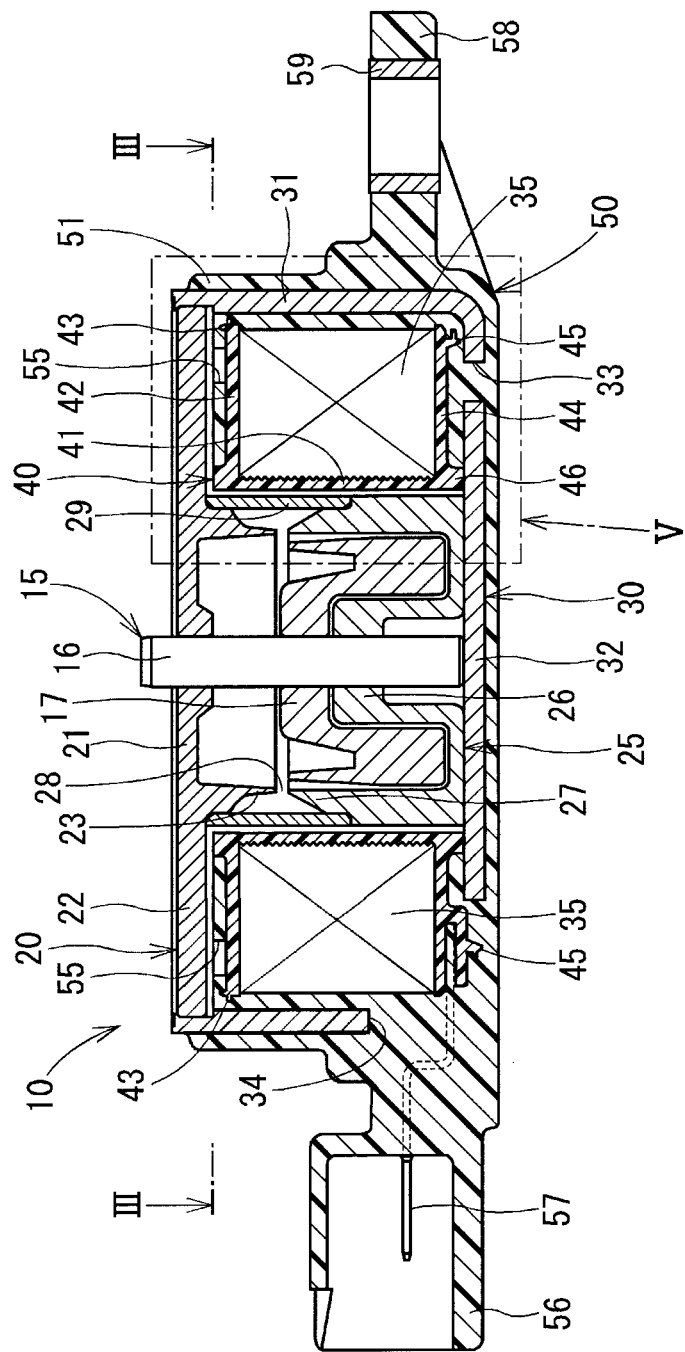
FIG. 2 is a cross-sectional view of the linear solenoid of the first embodiment, showing an operational state, in which an output rod is placed in an initial position.
Figure 3:
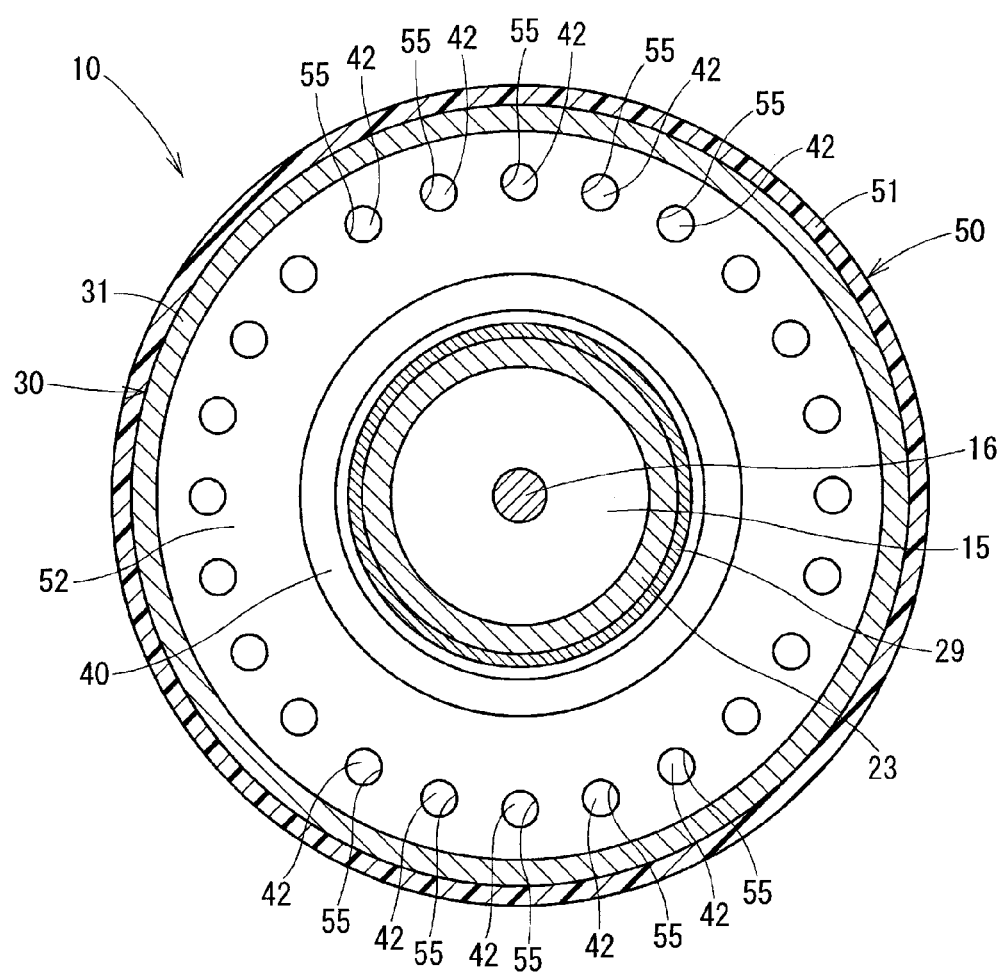
FIG. 3 is a cross sectional view taken along line III-III in FIG. 2.
Figure 4:
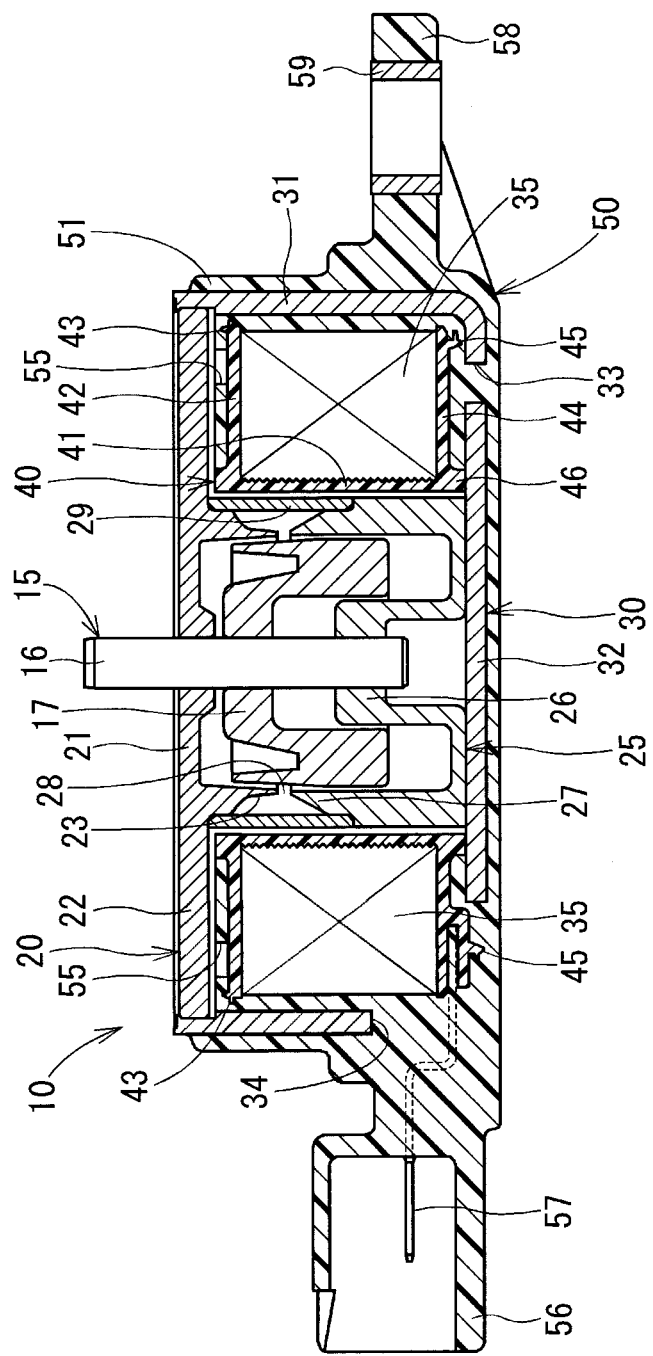
FIG. 4 is a cross-sectional view of the linear solenoid of the first embodiment, showing an operational state, in which the output rod is placed in a full stroke position.

FIG. 2 shows one operational state where the mover 15 is placed in an initial position, and FIG. 4 shows another operational state where the mover 15 is placed in a full stroke position. When the mover 15 is placed in the initial position, the movable core 17 is axially located on the second stationary core 25 side of the air gap 28. When the mover 15 is placed in the full stroke position, the movable core 17 is placed on the radially inner side of the air gap 28 such that the movable core 17 overlaps with both of the annular projection 23 and the annular projection 27 to magnetically bypass between the annular projection 23 and the annular projection 27, i.e., to conduct the magnetic flux between the first stationary core 20 and the second stationary core 25 through the movable core 17.

The collar 29 is made of a non-magnetic material. One end portion of the collar 29 is press fitted to the annular projection 23, and the other end portion of the collar 29 is press fitted to the annular projection 23. The collar 29 fixes the first stationary core 20 and the second stationary core 25 together. In other words, the collar 29 limits or prohibits movement of the first stationary core 20 and the second stationary core 25 relative to each other.

The yoke 30 is made of a magnetic material and is configured into a cup shaped body (cup shape member). Specifically, the yoke 30 includes a tubular portion (also referred to as a first yoke) 31 and a bottom portion (also referred to as a second yoke) 32. The bottom portion 32 is formed integrally with one end part (the lower end part in FIG. 2) of the tubular portion 31. The tubular portion 31 is placed on the radially outer side of the first stationary core 20 and the second stationary core 25. The flange portion 22 of the first stationary core 20 is inserted into the tubular portion 31 of the yoke 30. The other end part (the upper end part in FIG. 2) of the tubular portion 31 is swaged, i.e., is plastically deformed against the flange portion 22 of the first stationary core 20. Thereby, the flange portion 22 of the first stationary core 20 is fixed to the yoke 30 such that the other end part of the tubular portion 31 contacts the flange portion 22 of the first stationary core 20 (serving as one end portion of the stator). The bottom portion 32 closes the one end part of the tubular portion 31 and contacts the supporting portion 26 of the second stationary core 25 (serving as the other end portion of the stator). The yoke 30 magnetically couples between the first stationary core 20 and the second stationary core 25.

The coil 35 is placed between the tubular portion 31 of the yoke 30 and the first and second stationary cores 20, 25 in the radial direction. The coil 35 is made of a wire and is wound around the bobbin 40.

The housing 50 includes a main body 51, a connector portion 56 and a plurality of bracket portions 58. The yoke 30 is insert molded into the main body 51. Terminals 57, which are electrically connected to the coil 35, are received in the connector portion 56. The bracket portions 58 are used to install the linear solenoid 10 to an engine cover 89, which is shown in FIG. 1 and serves as an external support.

Next, a characteristic feature of the structure of the linear solenoid 10 will be described with reference to FIGS. 2 to 7.

The bobbin 40 is formed integrally and includes a winding portion 41, a first flange portion 42, a second flange portion 44 and a projection 46. The winding portion 41 is configured into a tubular form, and the coil 35 is wound around the winding portion 41. The first flange portion 42 is placed at one end part of the winding portion 41, which is located on an axial side where the first stationary core 20 is placed. The second flange portion 44 is placed at the other end part of the winding portion 41, which is axially opposite from the one end part of the winding portion 41. The projection 46 axially projects from the other end part of the winding portion 41 toward the bottom portion 32 of the yoke 30. The projection 46 contacts the bottom portion 32 of the yoke 30. A distal end part, i.e., a radially outer end part of the first flange portion 42 forms a first fusing protrusion 43. Furthermore, a distal end part, i.e., a radially outer end part of the second flange portion 44 forms a second fusing protrusion 45.

The main body 51 of the housing 50 is molded from the resin material such that the main body 51 covers an outer side of the yoke 30 and an outer side of the first flange portion 42 of the bobbin 40 and fills a space (gap) between the tubular portion 31 of the yoke 30 and the coil 35 and a space (gap) between the bottom portion 32 of the yoke 30 and the second flange portion 44. The first fusing protrusion 43 and the second fusing protrusion 45 of the bobbin 40 are joined and fused with the main body 51 of the housing 50. An outer portion of the main body 51, which is located on an outer side of the yoke 30, and an inner portion of the main body 51, which is located on an inner side of the yoke 30, are connected with each other through holes 33, 34 of the yoke 30.

Figure 6:
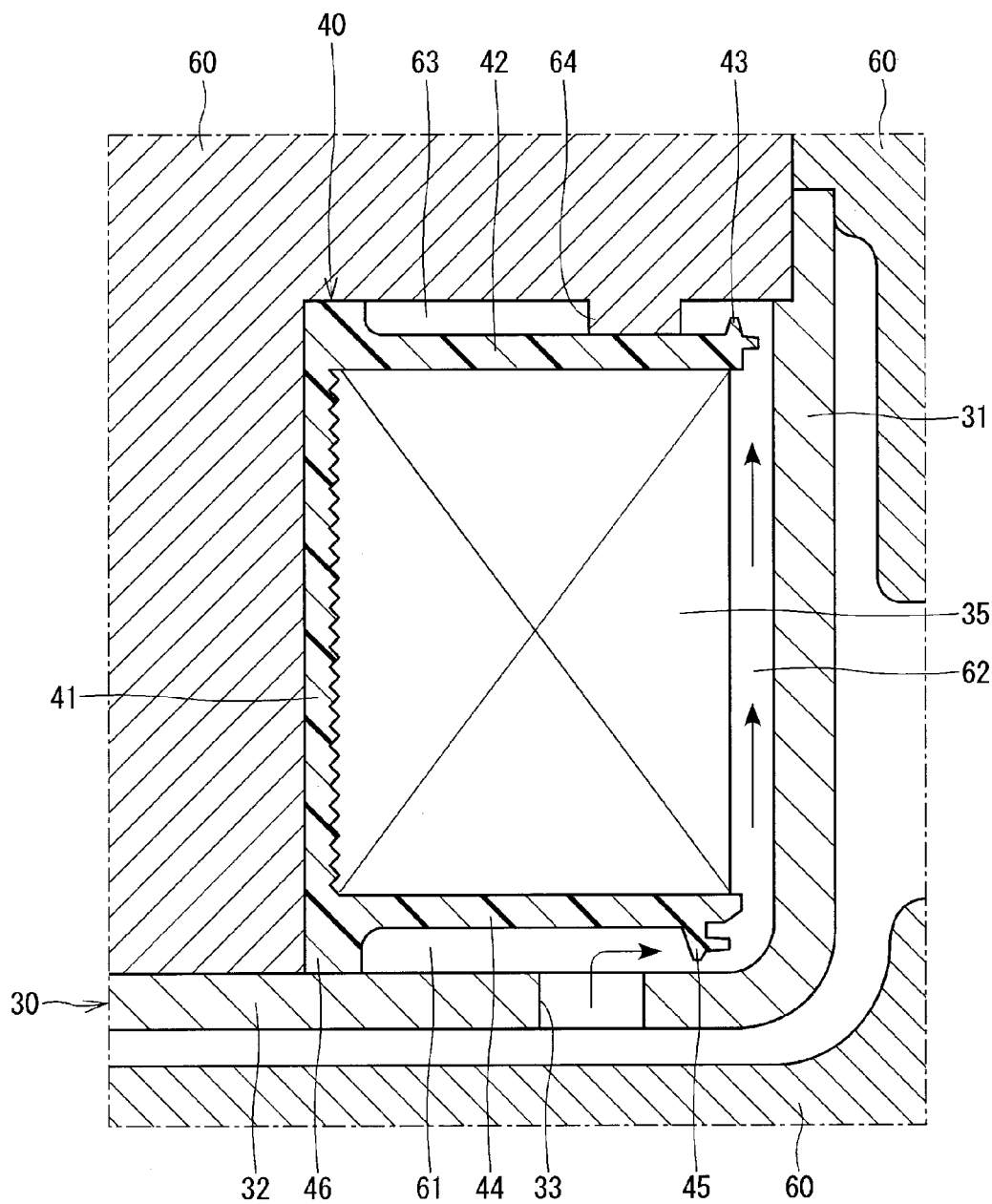
FIG. 6 is a cross-sectional view showing a yoke and a bobbin held in a molding die at the time of molding a housing of the linear solenoid shown in FIG. 2.
Figure 7:
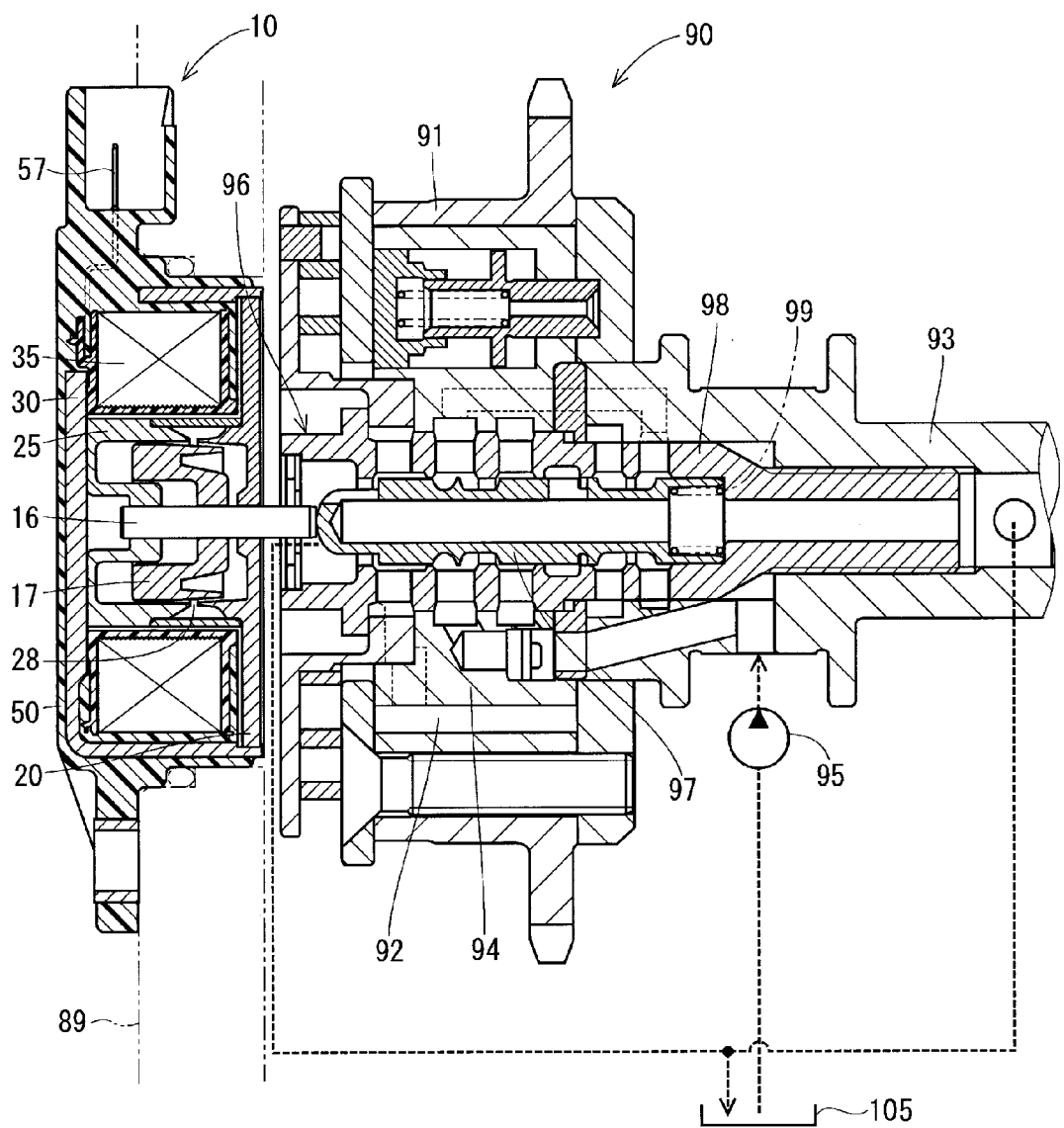
FIG. 7 is a schematic cross-sectional view of the valve timing control apparatus held in a state where the output rod of the linear solenoid of FIG. 1 is placed in the full stroke position.

In a production process of the housing 50, first of all, the yoke 30, the bobbin 40, the coil 35, the terminals 57 and insert collars 59 are set in a molding die 60, as shown in FIG. 6.

Then, the molten resin material is filled in a cavity of the molding die 60. The molten resin material, which is injected from a nozzle of a molding machine, flows from a gate, which is placed on the side where the bottom portion 32 of the yoke 30 is located, into the inside of the yoke 30 through the hole 33. The molten resin material, which flows into the inside of the yoke 30, flows through a gap 61 between the bottom portion 32 of the yoke 30 and the second flange portion 44 and a gap 62 between the tubular portion 31 of the yoke 30 and the coil 35 and is supplied into a gap 63 located on the outer side of the first flange portion 42. At this time, the molten resin material flows while the molten resin material heats a surface layer of the first fusing protrusion 43 and a surface layer of the second fusing protrusion 45 to melt or soften the same. Furthermore, the molding die 60 has pins 64, which axially project from the molding die 60 toward the first flange portion 42. The pins 64 push, i.e., urge the first flange portion 42 of the bobbin 40 from the axial side, which is opposite from the coil 35, to limit the deformation of the first flange portion 42 by the flow of the molten resin material, which flows from the gap 62 to the gap 63.

Thereafter, the molten resin material, which is filled in the inside of the molding die 60, is solidified by cooling the molten resin material. At this time, the first fusing protrusion 43 and the second fusing protrusion 45 of the bobbin 40 are joined and fused with the resin material of the housing 50.

Figure 5:
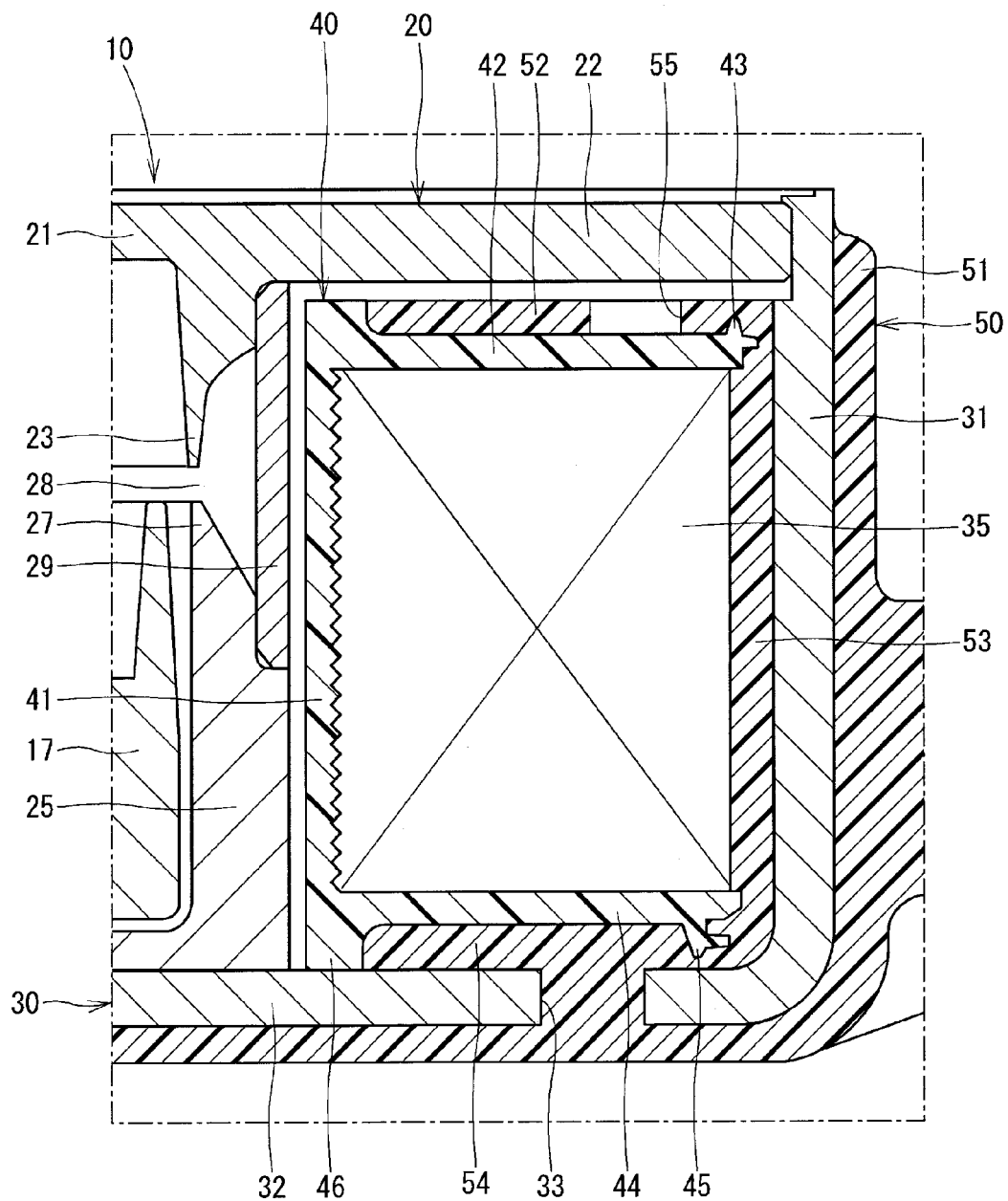
FIG. 5 is a partial enlarged view showing an area V in FIG. 2.

As shown in FIG. 5, the main body 51 of the housing 50 includes a first molded portion 52, a second molded portion 53 and a third molded portion 54. The first molded portion 52 is configured into an annular plate form and covers an outer side of the first flange portion 42 of the bobbin 40. The second molded portion 53 is configured into a cylindrical tubular form and fills the gap between the tubular portion 31 of the yoke 30 and the coil 35. The third molded portion 54 is configured into an annular plate form and fills the gap between the bottom portion 32 of the yoke 30 and the second flange portion 44 of the bobbin 40. The first molded portion 52 includes a plurality of through-holes 55. Each through-hole 55 axially extends through the first molded portion 52 at a corresponding location, which is on the radially inner side of the first fusing protrusion 43. The through-hole 55 is configured into a shape that is the same as that of the pin 64 of the molding die 60 shown in FIG. 6. In the present embodiment, each through-hole 55 is configured to have a circular cross-section. Furthermore, each through-hole 55 is placed in a radially outer part (outer peripheral part) of the first molded portion 52, which is adjacent to a radially outer part of the first flange portion 42. In other words, each through-hole 55 is placed at a radially outer part of the first flange portion 42. The through-holes 55 are arranged one after another at generally equal angular intervals in the circumferential direction about the central axis of the mover 15 (i.e, the central axis of the output rod 16).

The linear solenoid 10, which is constructed in the above described manner, is used in the environment where hydraulic oil is applied in the inside of the engine. The hydraulic oil penetrates into the inside of the linear solenoid 10. For example, in a state where the spool 97 of the valve timing control apparatus 90 is moved to a predetermined position, the hydraulic oil in the hydraulic pressure chamber 92 in the case 91 is drained toward the linear solenoid 10, and a portion of this hydraulic oil penetrates into the inside of the linear solenoid 10. The hydraulic oil, which penetrates into the inside of the linear solenoid 10, flows in the holes of the corresponding members and/or the gaps between the corresponding members. At this time, the heat, which is generated through the energization of the coil 35, is conducted to the first flange portion 42 of the bobbin 40 and is then released to the hydraulic oil penetrated into the through-holes 55 of the first molded portion 52 of the housing 50.

As discussed above, in the linear solenoid 10 of the first embodiment, the first flange portion 42 of the bobbin 40 forms the first fusing protrusion 43, which is fused with the housing 50. The first fusing protrusion 43 axially outwardly projects from the first flange portion 42 and may be configured into an annular form to circumferentially continuously extend about the central axis of the output rod 16 (or circumferentially intermittently extend about the central axis of the output rod 16, if desired). Therefore, it is possible to limit the intrusion of the hydraulic oil, which is present in the inside of the linear solenoid 10, to the coil 35 through the boundary surface between the housing 50 and the bobbin 40 without a need for providing a seal member between the yoke 30 and the housing 50. The second fusing protrusion 45 axially outwardly projects from the second flange portion 44 and may be configured into an annular form to circumferentially continuously extend about the central axis of the output rod 16 (or circumferentially intermittently extend about the central axis of the output rod 16, if desired).

Furthermore, in the first embodiment, the housing 50 includes the through-holes 55, which axially penetrate through the housing 50 on the radially inner side of the first fusing protrusion 43. Therefore, the heat of the coil 35, which is generated at the time of energizing the coil 35, is conducted to the first flange portion 42 of the bobbin 40 and is released to the hydraulic oil, which enters the through-holes 55 of the housing 50 and directly contacts the first flange portion 42 of the bobbin 40. In this way, the containment of the heat of the coil 35 in the inside of the housing 50 is limited. Specifically, the hydraulic oil in the inside of the linear solenoid 10 functions as the coolant. Therefore, it is possible to limit the reduction of the magnetic attractive force that attracts the mover 15. Furthermore, it is possible to limit the deterioration of the housing 50 made of the resin material caused by the containment of the heat of the coil 35 in the inside of the housing 50.

Furthermore, since the first fusing protrusion 43 is placed on the radially outer side of the through-holes 55, it is possible to limit the intrusion of the hydraulic oil from the inside of the through-holes 55 to the coil 35 through the boundary surface between the first flange portion 42 of the bobbin 40 and the first molded portion 52 of the housing 50.

Furthermore, in the first embodiment, the through-holes 55 are arranged one after another at the generally equal angular intervals in the circumferential direction about the central axis of the mover 15, more specifically, the central axis of the output rod 16. Therefore, the heat of the coil 35 can be generally uniformly released along the entire circumferential extent of the coil 35.

Furthermore, in the first embodiment, the through-holes 55 are arranged in the radially outer part of the first molded portion 52 of the housing 50. Therefore, the number of the through-holes 55 can be made as large as possible, and thereby the heat releasing performance (heat radiation performance) can be improved.

Second Embodiment

Figure 8:
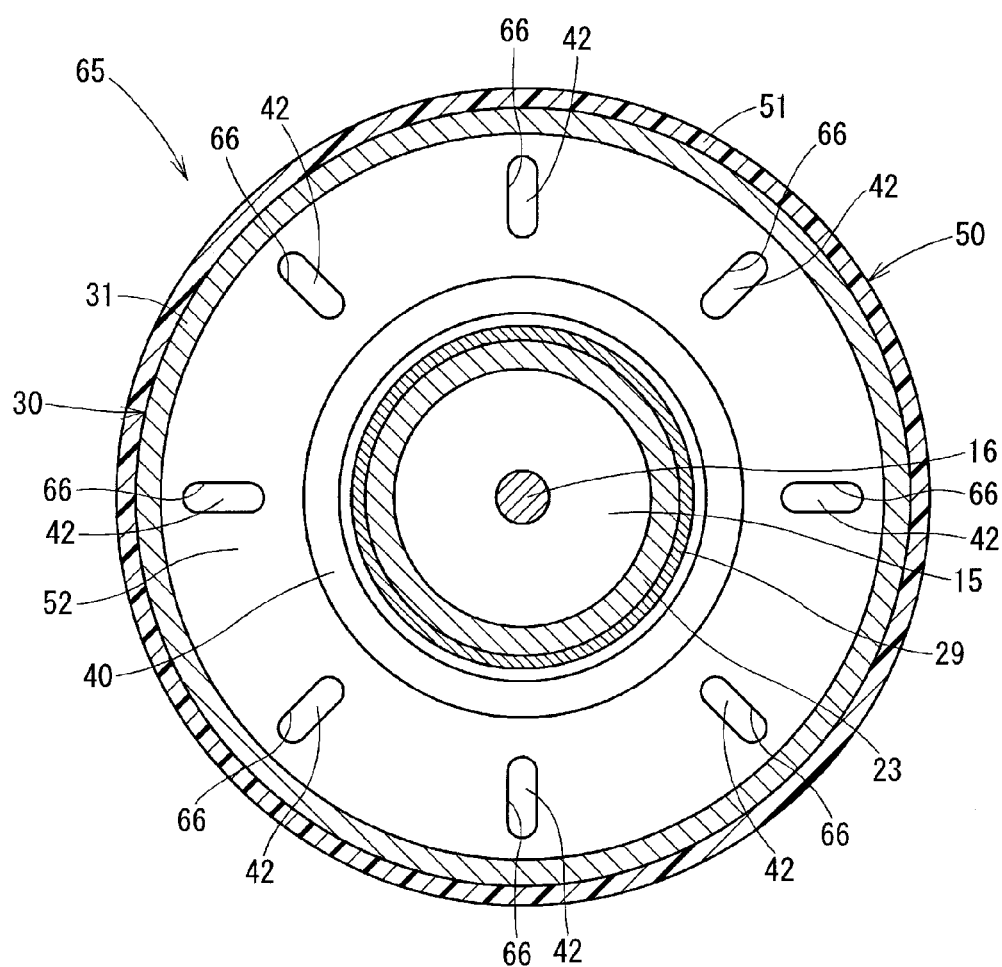
FIG. 8 is a cross-sectional view of a linear solenoid according to a second embodiment of the present disclosure.

A linear solenoid according to a second embodiment of the present disclosure will be described with reference to FIG. 8. The second embodiment is a modification of the first embodiment.

In the linear solenoid 65, the first molded portion 52 of the housing 50 has through-holes 66, which axially penetrate through the first molded portion 52 on the radially inner side of the first fusing protrusion 43. Each through-hole 66 has an oval cross section (e.g., a cross section having an oval track shape or an oblong shape) that is elongated in the radial direction of the output rod 16. The through-holes 66 are arranged one after another at generally equal angular intervals in the circumferential direction about the central axis of the mover 15.

According to the second embodiment, the heat of the coil 35 can be released to the hydraulic oil, which is present in the through-holes 66, so that the advantages, which are similar to those of the first embodiment, can be achieved.

Third Embodiment

Figure 9:
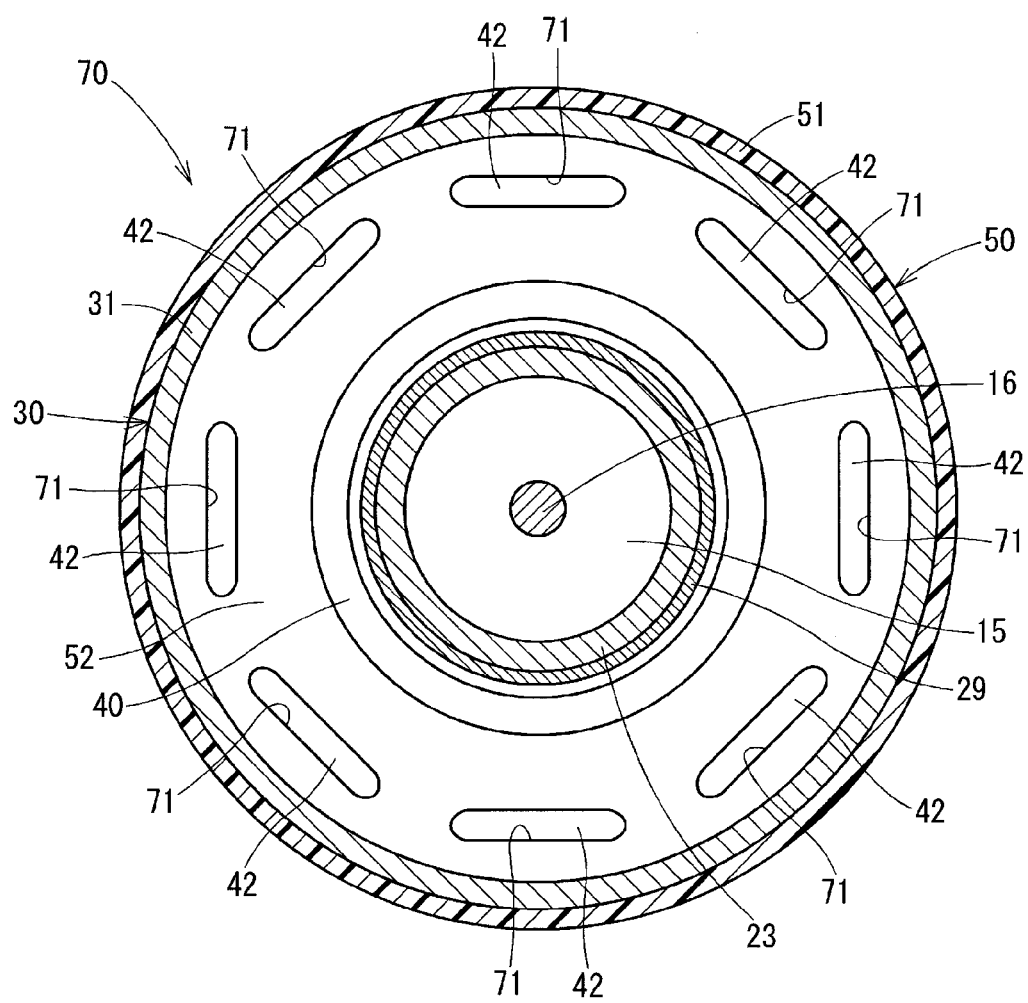
FIG. 9 is a cross-sectional view of a linear solenoid according to a third embodiment of the present disclosure.

A linear solenoid according to a third embodiment of the present disclosure will be described with reference to FIG. 9. The third embodiment is a modification of the first embodiment.

In the linear solenoid 70, the first molded portion 52 of the housing 50 has through-holes 71, which axially penetrate through the first molded portion 52 on the radially inner side of the first fusing protrusion 43. Each through-hole 71 has an oval cross section (e.g., a cross section having an oval track shape or an oblong shape) that is elongated in the circumferential direction (or in a direction generally perpendicular to the radial direction in FIG. 9). The through-holes 71 are arranged one after another at generally equal angular intervals in the circumferential direction about the central axis of the mover 15.

According to the third embodiment, the heat of the coil 35 can be released to the hydraulic oil, which is present in the through-holes 71, so that the advantages, which are similar to those of the first embodiment, can be achieved.

Fourth Embodiment

Figure 10:
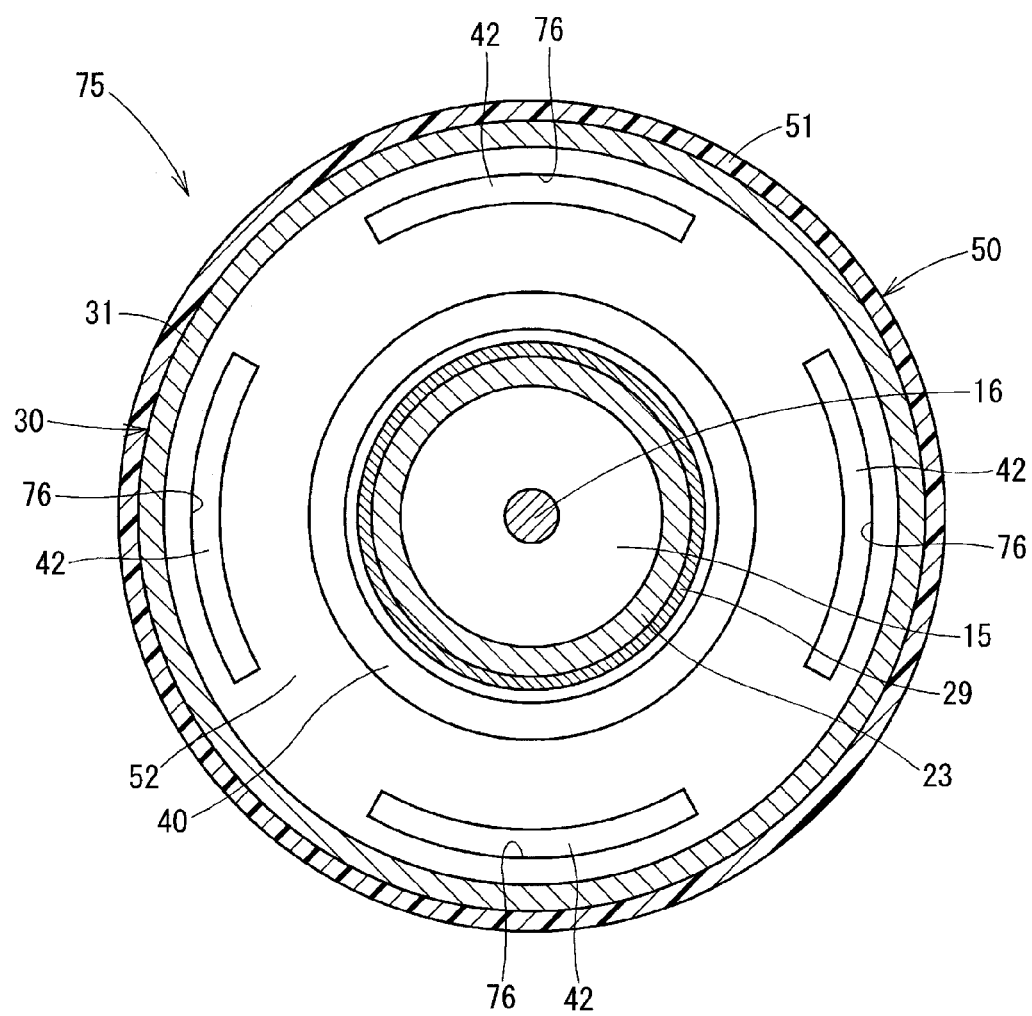
FIG. 10 is a cross-sectional view of a linear solenoid according to a fourth embodiment of the present disclosure.

A linear solenoid according to a fourth embodiment of the present disclosure will be described with reference to FIG. 10. The fourth embodiment is a modification of the first embodiment.

In the linear solenoid 75, the first molded portion 52 of the housing 50 has through-holes 76, which axially penetrate through the first molded portion 52 on the radially inner side of the first fusing protrusion 43. Each through-hole 76 has an arcuate cross section that is elongated in the circumferential direction. The through-holes 76 are arranged one after another at generally equal angular intervals in the circumferential direction about the central axis of the mover 15.

According to the fourth embodiment, the heat of the coil 35 can be released to the hydraulic oil, which is present in the through-holes 76, so that the advantages, which are similar to those of the first embodiment, can be achieved.

Fifth Embodiment

Figure 11:
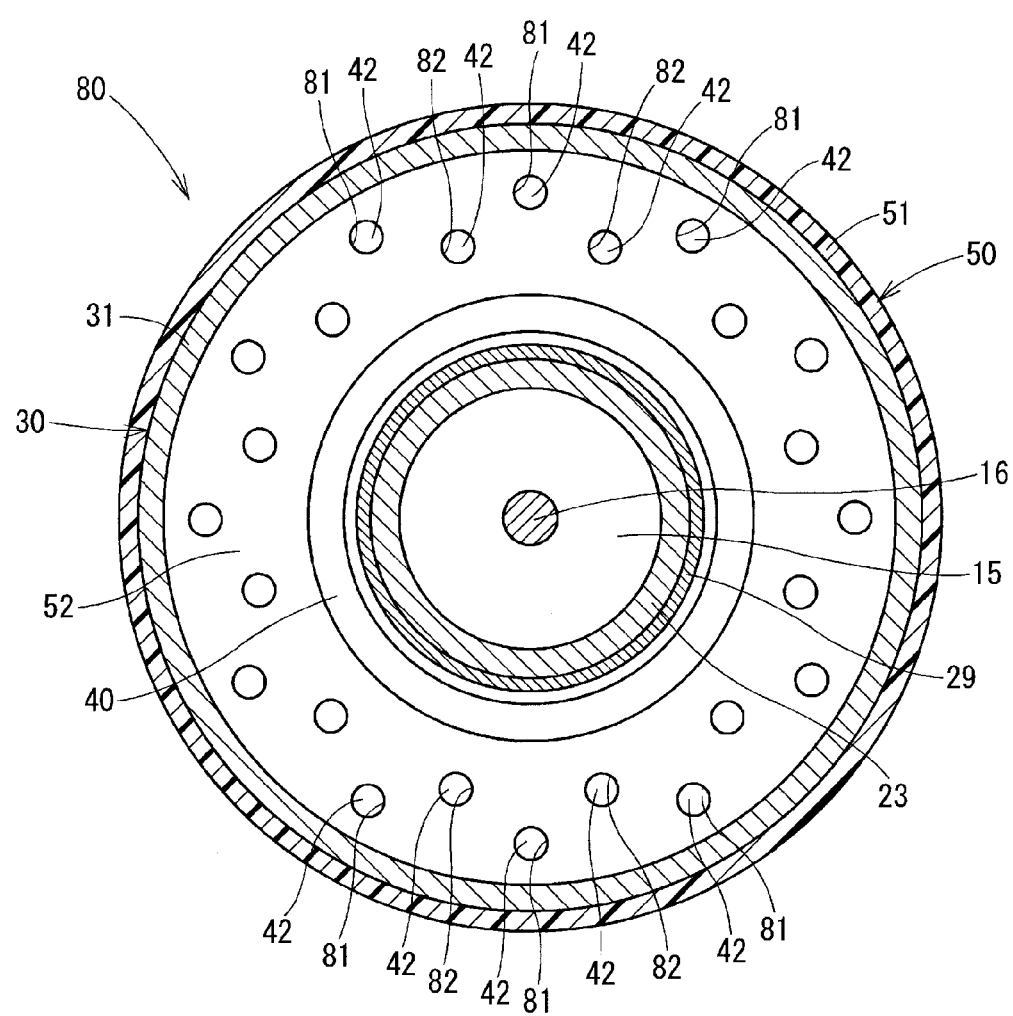
FIG. 11 is a cross-sectional view of a linear solenoid according to a fifth embodiment of the present disclosure.

A linear solenoid according to a fifth embodiment of the present disclosure will be described with reference to FIG. 11. The fifth embodiment is a modification of the first embodiment.

In the linear solenoid 80, the first molded portion 52 of the housing 50 has through-holes 81, 82 which axially penetrate through the first molded portion 52 on the radially inner side of the first fusing protrusion 43. In the present embodiment, each of the through-holes 81 is configured to have a circular cross-section and is placed in the radially outer part of the first molded portion 52. The through-holes 81 are arranged one after another at generally equal angular intervals in the circumferential direction about the central axis of the mover 15. Each of the through-holes 82 is configured to have a circular cross-section and is placed in the radially outer part of the first molded portion 52. The through-holes 82 are arranged one after another at generally equal angular intervals in the circumferential direction about the central axis of the mover 15 at a radial location, which is on the radially inner side of the through-holes 81.

According to the fifth embodiment, the heat of the coil 35 can be released to the hydraulic oil, which is present in the through-holes 81 and the through-holes 82, so that the advantages, which are similar to those of the first embodiment, can be achieved.

Sixth Embodiment

Figure 12:
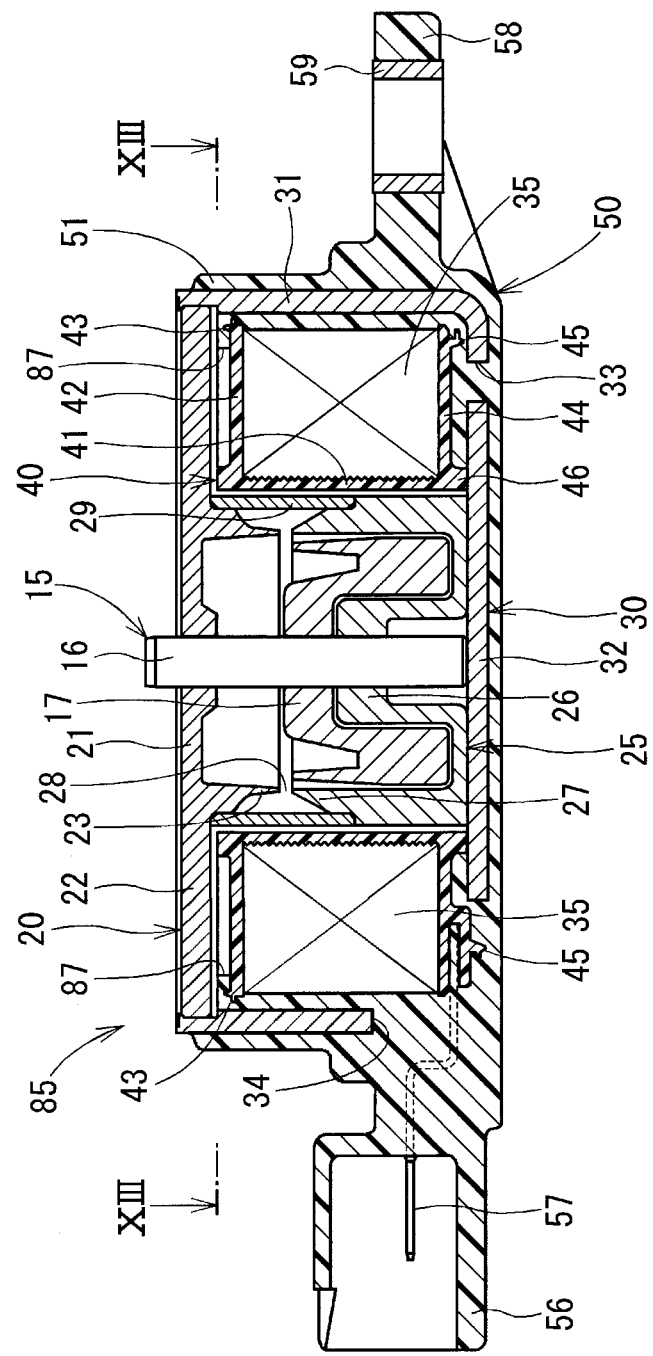
FIG. 12 is a cross-sectional view of a linear solenoid according to a sixth embodiment of the present disclosure.
Figure 13:
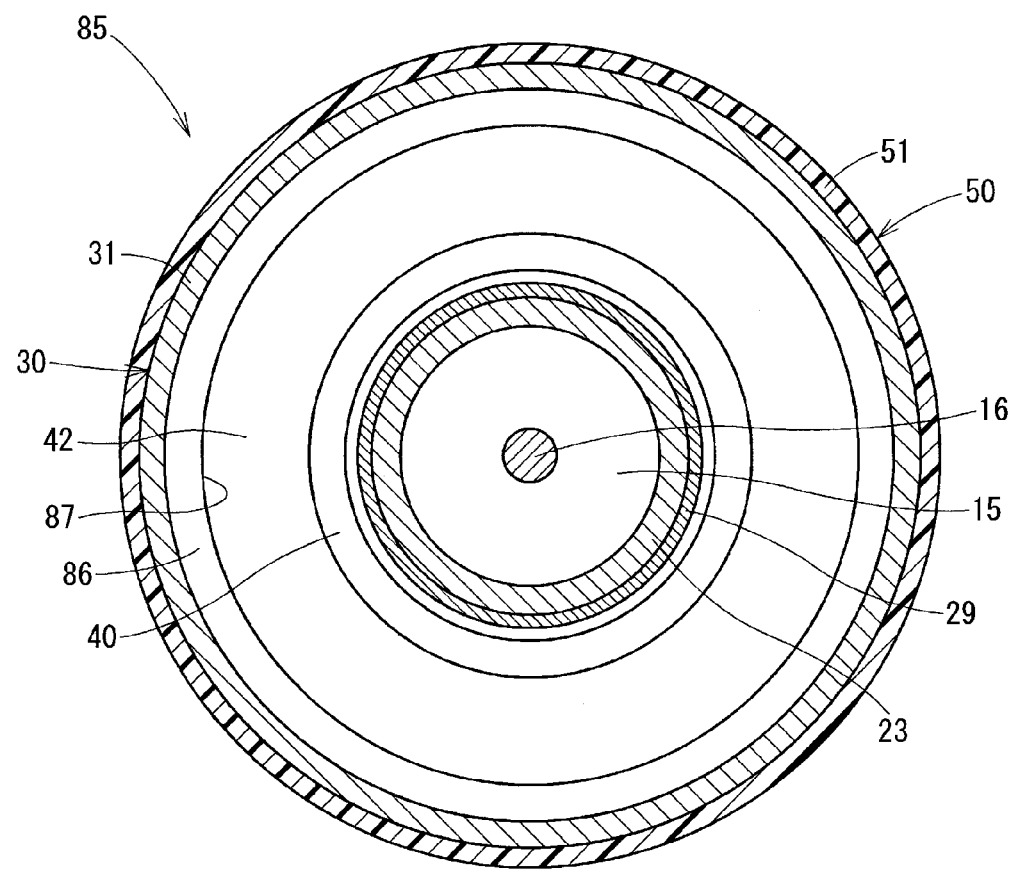
FIG. 13 is a cross sectional view taken along line XIII-XIII in FIG. 12.

A linear solenoid according to a sixth embodiment of the present disclosure will be described with reference to FIGS. 12 and 13. The sixth embodiment is a modification of the first embodiment.

In the linear solenoid 85, the first molded portion 86 of the housing 50 has a through-hole 87, which axially penetrates through the first molded portion 86 on the radially inner side of the first fusing protrusion 43. The through-hole 87 is coaxial with the mover 15. An outer diameter (a diameter of a radially outer edge) of the through-hole 87 is smaller than the outer diameter of the first flange portion 42, and an inner diameter (a diameter of a radially inner edge) of the through-hole 87 is larger than the outer diameter of the winding portion 41. In other words, the through-hole 87 is radially located between the radially outer edge of the first flange portion 42 and the radially outer edge of the winding portion 41.

According to the sixth embodiment, the heat of the coil 35 can be released to the hydraulic oil, which is present in the through-hole 87, so that the advantages, which are similar to those of the first embodiment, can be achieved. Furthermore, a cross-sectional area of the through-hole 87 can be made as large as possible, and thereby the heat releasing performance (heat radiation performance) is improved.

Seventh Embodiment

Now, a seventh embodiment of the present disclosure will be described with reference to FIGS. 14 to 17. The seventh embodiment is a modification of the first embodiment.

The linear solenoid 1 includes a coil arrangement 100, a yoke 115, a housing 200, a first stationary core 20, a second stationary core 25, an output rod (also referred to as a shaft) 35, a movable core 17 and a collar 29.

The coil arrangement 100 includes a bobbin 11 and a coil 12. The bobbin 11 is formed into a tubular form. The coil 12 is formed into an annular form and is made of an electric wire, which is wound around the bobbin 11.

The yoke 115 is made of a magnetic material (a magnetic metal material) and includes a tubular portion 116 and a bottom portion 117. The tubular portion 116 is placed on an outer side of the coil arrangement 100 in the radial direction. The bottom portion 117 is formed integrally with one end part (the lower end part in FIG. 14) of the tubular portion 116. The tubular portion 116 serves as a first yoke, the bottom portion 117 serves as a second yoke.

The housing 200 includes a main body 121, a connector portion 123 and bracket portions 124. The coil arrangement 100 and the yoke 115 are insert molded into the main body 121. Terminals 57, which are electrically connected to the coil 12, are received and held in the connector portion 123. The bracket portions 124 are used to install the housing 200 to, for example, the engine cover 89 (see FIG. 1), which serves as the external support.

The first stationary core 20 is made of a magnetic material (a magnetic metal material) and is placed on one axial side of the coil 12, i.e., is placed at the other end part (the upper end part in FIG. 14) of the tubular portion 116, which is opposite from the one end part of the tubular portion 116 in the axial direction. The first stationary core 20 has a first annular projection 28, which projects toward the bottom portion 117 of the yoke 115 in the axial direction. A radially outer end portion (an outer peripheral portion) of the first stationary core 20 is fixed to the tubular portion 116 of the yoke 115 by swaging, i.e., by plastically deforming the end part of the tubular portion 116 against the radially outer end portion of the first stationary core 20.

The second stationary core 25 is made of a magnetic material and is placed on the other axial side of the coil 12, i.e., is placed at the one end part of the tubular portion 116. The second stationary core 25 contacts the bottom portion 117 of the yoke 115 in the axial direction and has a second annular projection 27. The second annular projection 27 projects toward the first annular projection 28 such that an air gap 47 is interposed between the second annular projection 27 and the first annular projection 28 in the axial direction. The first stationary core 20 and the second stationary core 25 are magnetically coupled with each other through the yoke 115.

Figure 14:
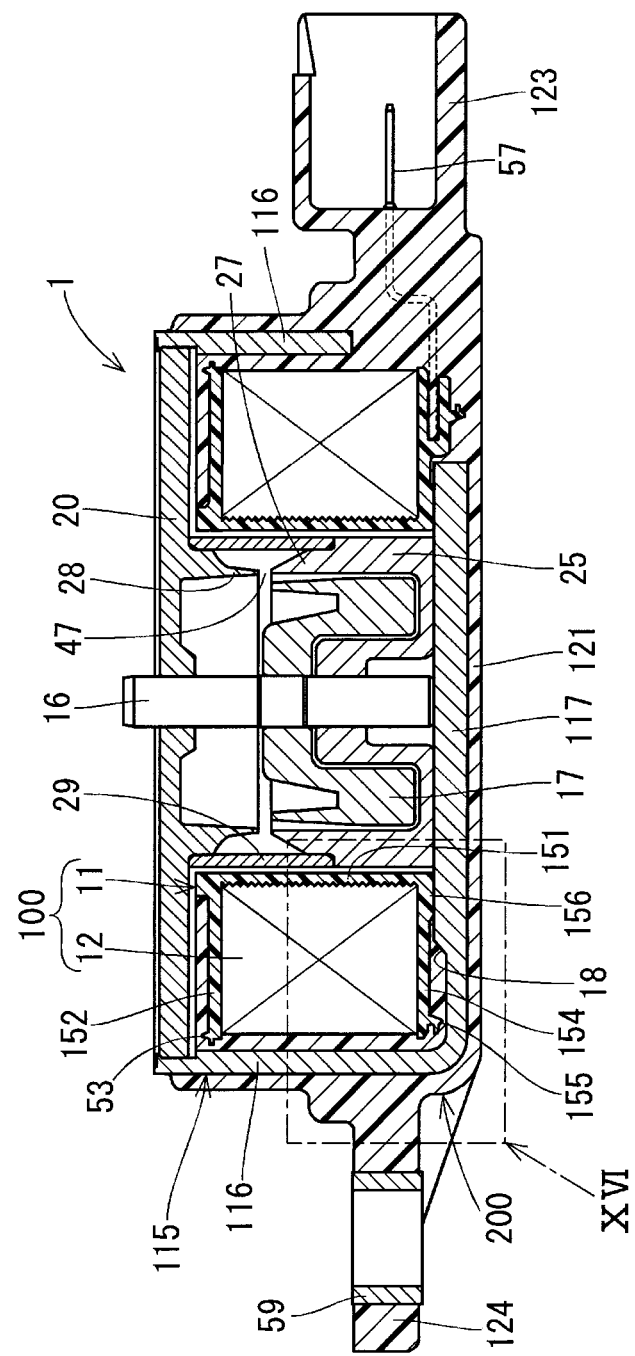
FIG. 14 is a cross-sectional view of the linear solenoid of a seventh embodiment, showing an operational state, in which an output rod is placed in an initial position.
Figure 15:
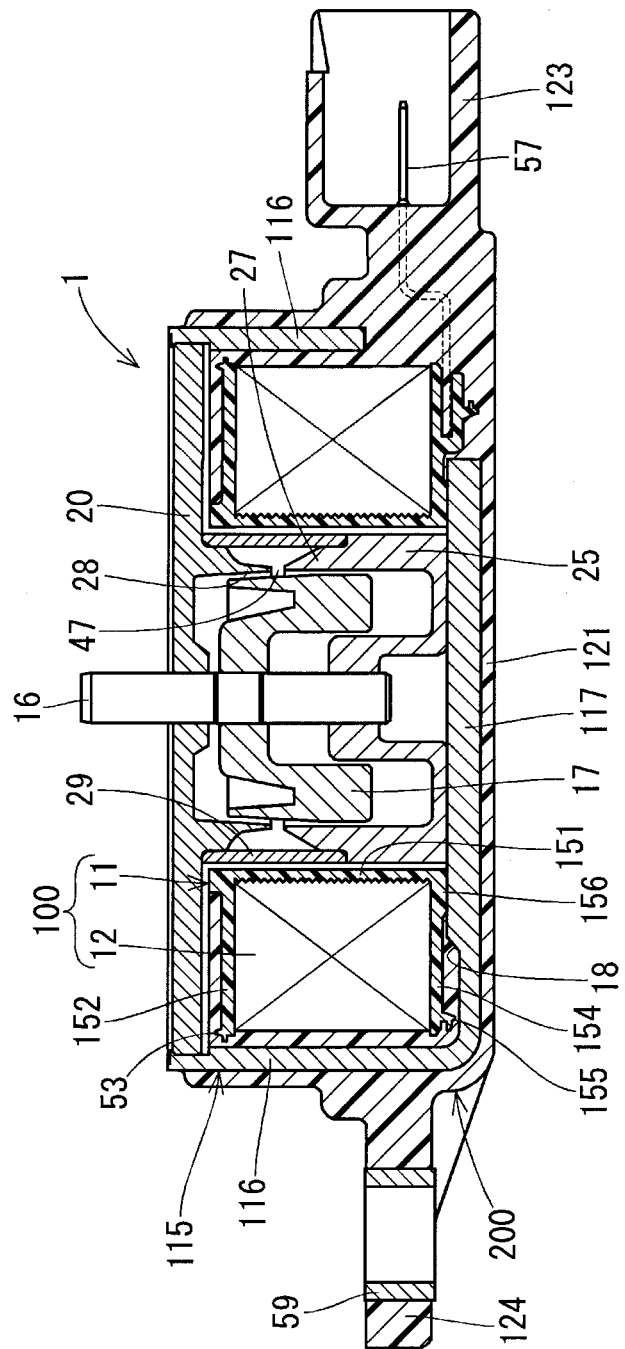
FIG. 15 is a cross-sectional view of the linear solenoid of FIG. 14, showing another operational state, in which the output rod is placed in a full stroke position.

The output rod 16 is slidably supported by the first stationary core 20 and the second stationary core 25 on a radially inner side of the air gap 47. The output rod 16 can axially reciprocate between an initial position, which is located on the second stationary core 25 side, and a full stroke position, which is located on the first stationary core 20 side. FIG. 14 shows one operational state where the output rod 16 is placed in the initial position, and FIG. 15 shows another operational state where the output rod 16 is placed in the full stroke position.

The movable core 17 is made of a magnetic material. The movable core 17 is placed between the first stationary core 20 and the second stationary core 25 in the axial direction and is fixed to the output rod 16. When the output rod 16 is placed in the initial position, the movable core 17 is placed on the second stationary core 25 side of the air gap 47. When the output rod 16 is placed in the full stroke position, the movable core 17 is placed radially inward of the air gap 47 such that the movable core 17 overlaps with both of the first annular projection 28 and the second annular projection 27 to magnetically bypass between the first annular projection 28 and the second annular projection 27, i.e., to conduct the magnetic flux between the first stationary core 20 and the second stationary core 25 through the movable core 17.

The collar 29 is a tubular member and is placed between the first stationary core 20 and the second stationary core 25. The collar 29 is made of a non-magnetic material. One end portion of the collar 29 is press fitted to the first annular projection 28, and the other end portion of the collar 29 is press fitted to the second annular projection 27. The collar 29 limits or prohibits movement of the first stationary core 20 and the second stationary core 25 relative to each other in both of the axial direction and the radial direction.

Figure 16:
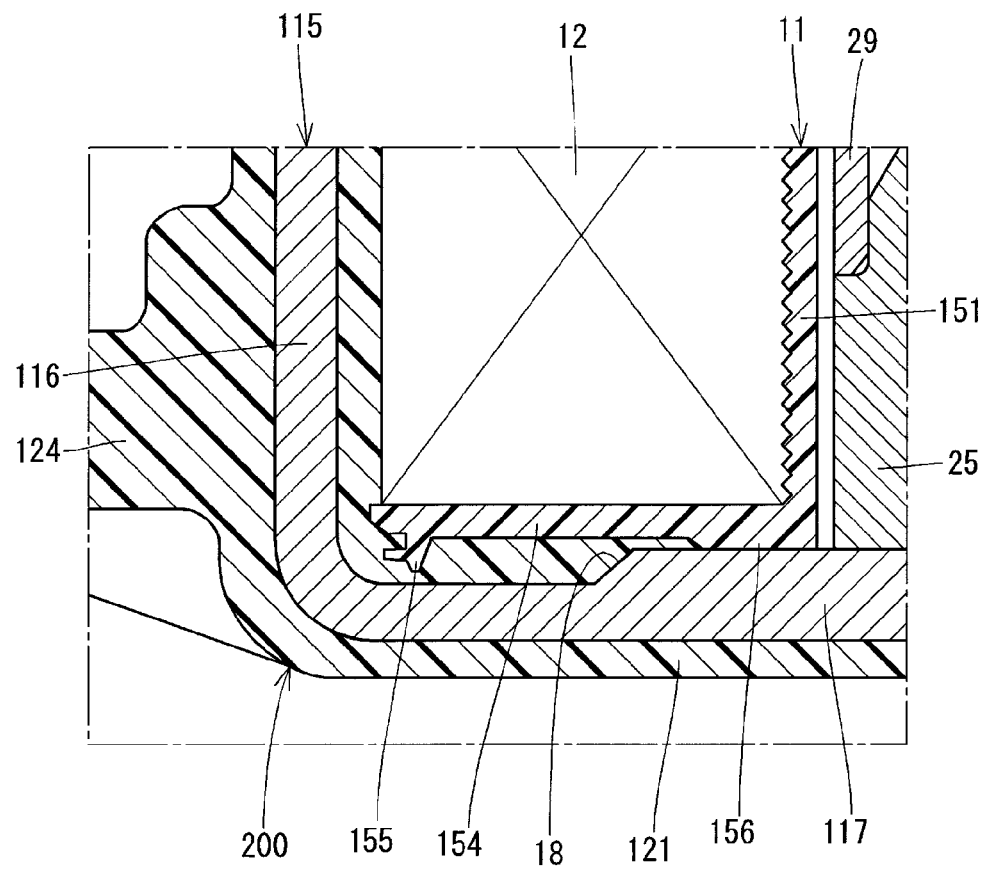
FIG. 16 is a partial enlarged view showing an area XVI of FIG. 14.

Next, a characteristic feature of the structure of the linear solenoid 1 will be described with reference to FIGS. 14 to 16.

The bobbin 11 is formed integrally and includes a winding portion 151, a first flange portion 152, a first fusing protrusion 53, a second flange portion 154, a second fusing protrusion 155 and a projection 156. The winding portion 151 is configured into a tubular form, and the coil 12 is wound around the winding portion 151. The first flange portion 152 is placed at one end part (one axial end part) of the winding portion 41, which is located on an axial side where the first stationary core 20 is placed, and the first flange portion 152 radially outwardly extends from the one end part of the winding portion 151. The first fusing protrusion 53 is formed at a distal end part, i.e., a radially outer end part of the first flange portion 152. The second flange portion 154 is placed at the other end part (other axial end part) of the winding portion 151, which is axially opposite from the one end part of the winding portion 151, and the second flange portion 154 radially outwardly extends from the other end part of the winding portion 151. The second fusing protrusion 155 is formed at a distal end part, i.e., a radially outer end part of the second flange portion 154. The projection 156 axially projects from the other end part of the winding portion 151 toward the bottom portion 117 of the yoke 115. The projection 156 of the bobbin 11 contacts the bottom portion 117 of the yoke 115.

The main body 121 of the housing 200 is molded from the resin material such that the main body 121 covers an outer side of the yoke 115 and an outer side of the first flange portion 152 of the bobbin 11 and fills a space (gap) between the tubular portion 116 of the yoke 115 and the coil 12 and a space (gap) between the bottom portion 117 of the yoke 115 and the second flange portion 154 of the bobbin 11. The first fusing protrusion 53 and the second fusing protrusion 155 of the bobbin 11 are joined and fused with the housing 200.

The bottom portion 117 of the yoke 115 includes a step surface 18, which is formed on a radially outer side of the projection 156 of the bobbin 11. The step surface 18 is tapered such that an outer diameter of the step surface 18 progressively decreases in the axial direction toward the second flange portion 154, and a radially outer part of the bottom portion 117 of the yoke 115, which is located on a radially outer side of the step surface 18, is axially recessed from a center part of the bottom portion 117 of the yoke 115, which is located on a radially inner side of the step surface 18. The step surface 18 serves as a pressure reducing part that is configured to reduce a molding pressure, which is applied to the projection 156 of the bobbin 11 by a flow movement of the molten resin material at the time of molding the housing 200. The way of the reducing the molding pressure with the step surface 18 will be described later.

Next, a manufacturing process of the housing 200 will be described with reference to FIGS. 14 and 17.

Figure 17:
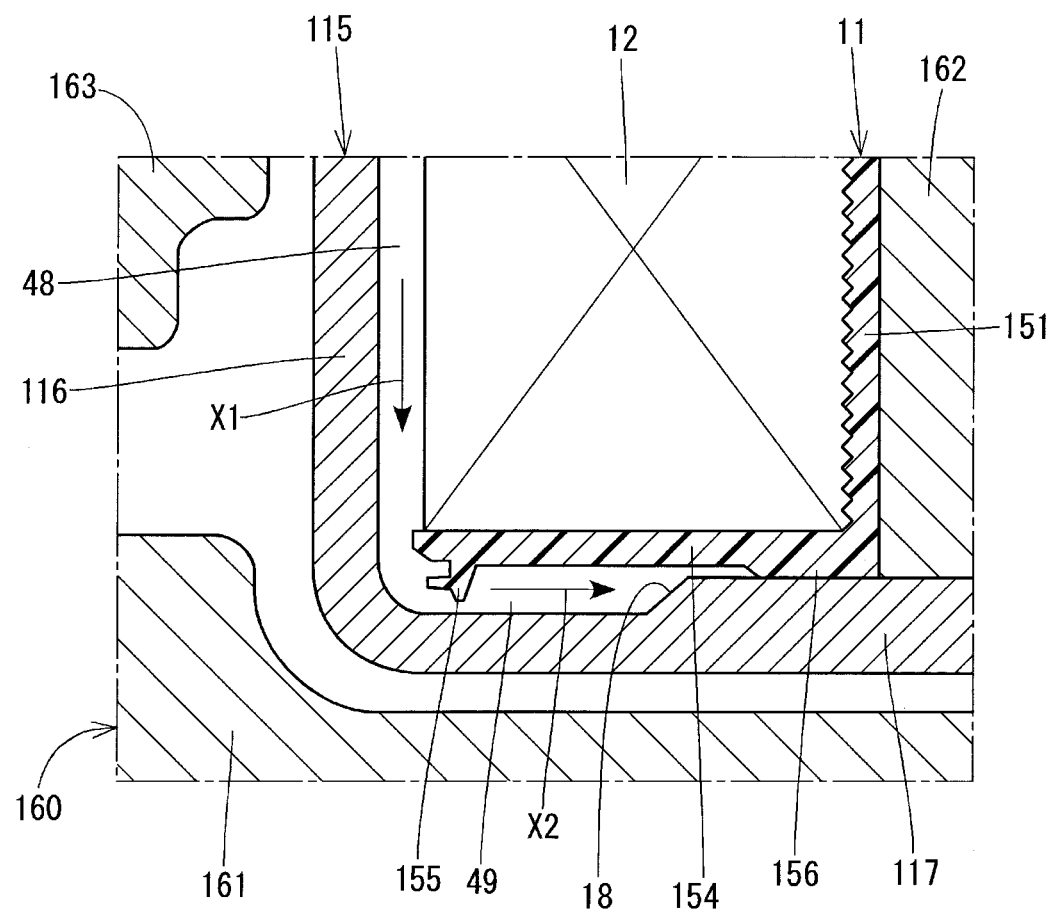
FIG. 17 is a cross-sectional view showing a yoke and a bobbin held in a molding die at the time of resin molding a housing of the linear solenoid shown in FIG. 14.

First of all, among the components of the linear solenoid 1 shown in FIG. 14, the yoke 115, the bobbin 11, the coil 12 wound around the bobbin 11, the terminals 57 and the insert collars 59 are set in the molding die 160 shown in FIG. 17. The molding die 160 includes first to third molding dies (also referred to as first to third molding die parts) 161-163, which are partially shown in FIG. 17.

Then, the molten resin material is filled in a cavity of the molding die 160. At this time, the molten resin material, which is injected from a nozzle of a molding machine, flows from a gate (not shown) into an inside of the yoke 115. The molten resin material, which flows into the inside of the yoke 115, heats a surface layer of the first fusing protrusion 53 and a surface layer of the second fusing protrusion 155 to melt or soften the same.

Furthermore, as indicated by an arrow X1 in FIG. 17, the molten resin material flows through a first gap (a radial gap) 48 that is radially defined between the tubular portion 116 of the yoke 115, which is located on a radially outer side of the first gap 48, and the coil 12 and the bobbin 11, which are located on a radially inner side of the first gap 48. Thereafter, as indicated by an arrow X2 in FIG. 17, the molten resin material flows in a second gap (an axial gap) 49 that is axially defined between the bottom portion 117 of the yoke 115, which is located on an axially outer side of the second gap 49, and the second flange portion 154, which is located on an axially inner side of the second gap 49. The molten resin material, which flows in the second gap 49, contacts the step surface 18 at the time of flowing toward the projection 156 of the bobbin 11. As discussed above, the molding pressure, which is exerted at the time of molding the housing 200, is received by the step surface 18 of the yoke 115, so that the molding pressure, which is applied to the projection 156 of the bobbin 11 is reduced, and thereby it is possible to limit radially inward flexing of the projection 156.

Thereafter, the molten resin material, which is filled in the inside of the molding die 160, is solidified by cooling the molten resin material. At this time, the first fusing protrusion 53 and the second fusing protrusion 155 of the bobbin 11 are joined and fused with the housing 200.

Next, the solidified housing 200 and the other associated components are removed from the die 160.

As discussed above, in the linear solenoid 1 of the seventh embodiment, the bottom portion 117 of the yoke 115 includes the step surface 18, which is located on the radially outer side of the projection 156 of the bobbin 11. As discussed above, the step surface 18 receives the molding pressure at the time of molding the housing 200, and thereby the step surface 18 can reduce the molding pressure, which is applied to the projection 156 of the bobbin 11. Thus, the step surface 18 serves as the pressure reducing part.

Therefore, at the time of molding the housing 200, the radially inward flexing of the projection 156 of the bobbin 11 is limited. As a result, formation of burrs from the molding resin material and formation of cracks of the bobbin 11 caused by the radially inward flexion of the projection 156 can be limited. As a result, removal of the burrs, which are formed from the molding resin material, as well as intrusion of the burrs into the sliding part(s) of the linear solenoid 1 and/or the sliding part(s) of the spool 108 of the hydraulic pressure change valve 107 can be avoided or limited. Also, it is possible to limit the conduction of the oil, which is present in the inside of the linear solenoid 1, to the electronic control device through the crack of the bobbin 11 as well as the coil 12 and the terminals 57.

Furthermore, in the seventh embodiment, the housing 200 is resin molded such that the housing 200 covers the outer side of the yoke 115 and the outer side of the first flange portion 152 of the bobbin 11 and fills the gap between the tubular portion 116 of the yoke 115 and the coil 12 as well as the bobbin 11 and the gap between the bottom portion 117 of the yoke 115 and the second flange portion 154 of the bobbin 11. In addition, the housing 200 is joined and fused with the first fusing protrusion 53 and the second fusing protrusion 155 of the bobbin 11.

Therefore, it is possible to limit the intrusion of the oil, which is present in the inside of the linear solenoid 1, into the coil 12 through the boundary between the housing 200 and the bobbin 11, without providing an O-ring between the yoke 115 and the bobbin 11. Therefore, it is possible to limit the conduction of the oil from the coil 12 to the electronic control device through the terminals 57.

In the seventh embodiment, the yoke 115 is configured into a cup shape and is integrally formed as a single member (a cup shape member).

Therefore, the inside of the yoke 115 is completely sealed by the fusing between the housing 200 and the bobbin 11, so that a leak passage of the oil can be completely eliminated.

Furthermore, in the seventh embodiment, the bracket portions 124, which are used to install the housing 200 to the external apparatus (e.g., the engine cover), form the parts of the housing 200 made of the resin material.

Therefore, in comparison to a case where the brackets form parts of a yoke made of a metal material, the weight of the linear solenoid 1 is reduced, and the press working process of the yoke is eased.

Eighth Embodiment

Figure 18:
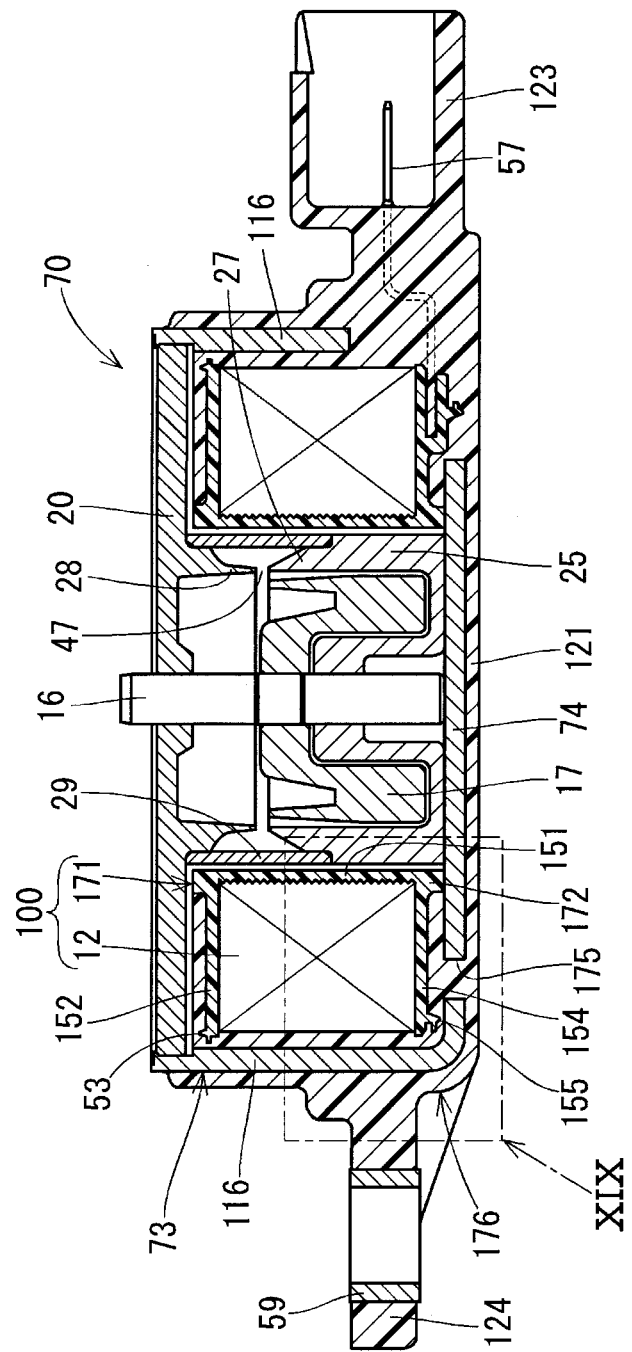
FIG. 18 is a cross-sectional view of a linear solenoid according to an eighth embodiment of the present disclosure.
Figure 19:
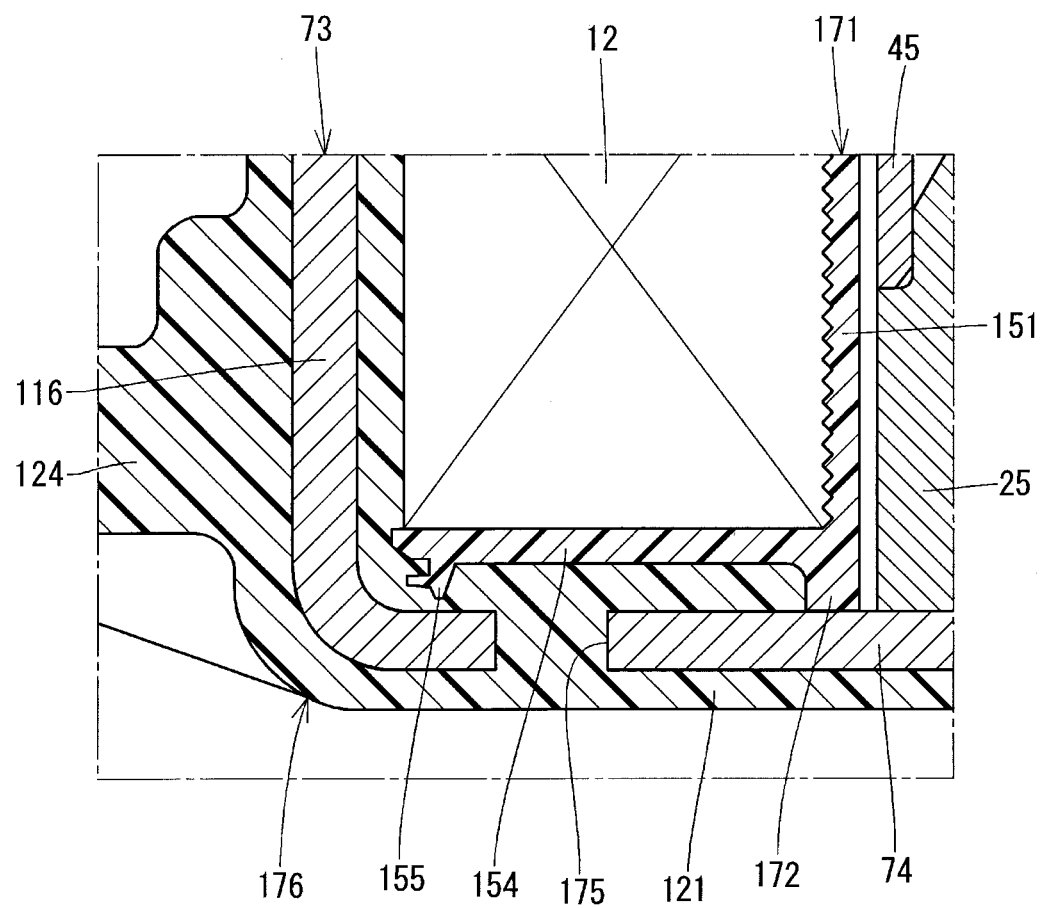
FIG. 19 is a partial enlarged view of an area XIX in FIG. 18.

A linear solenoid according to an eighth embodiment of the present disclosure will be described with reference to FIGS. 18 to 20. The eighth embodiment is a modification of the seventh embodiment.

In the linear solenoid 70, the bobbin 171 includes a projection 172. The projection 172 axially projects from the winding portion 151 toward the bottom portion 74 of the yoke 73.

The bottom portion 74 of the yoke 73 includes a plurality of through-holes 175. The through-holes 175 are located on a radially outer side of the projection 172 of the bobbin 171 and axially penetrate through the bottom portion 74 of the yoke 73. The through-holes 175 are arranged at, for example, generally equal intervals in the circumferential direction. The through-holes 175 serve as pressure reducing parts that can reduce the molding pressure, which is applied to the projection 172 of the bobbin 171 at the time of molding the housing 176.

Figure 20:
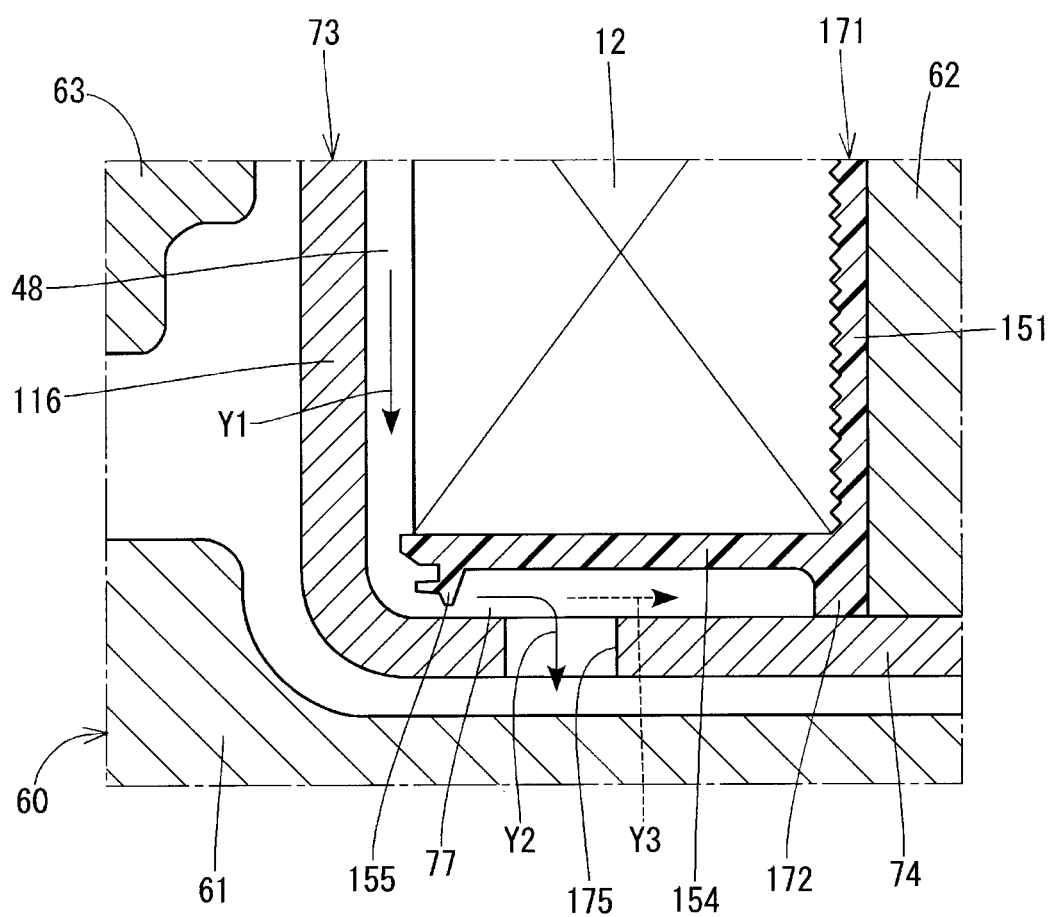
FIG. 20 is a cross-sectional view showing a yoke and a bobbin held in a molding die at the time of resin molding a housing of the linear solenoid shown in FIG. 18.

At the time of molding the housing 176 from the resin material, the molten resin material, which is injected from the nozzle of the molding machine, flows from the gate (not shown) to the inside of the yoke 73, as indicated by an arrow Y1 in FIG. 20. Thereafter, as indicated by an arrow Y2 in FIG. 20, the molten resin material flows from the inside of the yoke 73 to the outside of the yoke 73 through the through-holes 175 of the bottom portion 74 of the yoke 73. The molten resin material, which flows from the first gap 48 to the second gap 77 defined between the bottom portion 74 of the yoke 73 and the second flange portion 154 of the bobbin 171, tends to flow toward the outer side of the yoke 73, which forms the larger space, as indicated by an arrow Y2 in FIG. 20 rather than flowing toward the projection 172 side of the bobbin 171 in a direction of an arrow Y3 shown in FIG. 20. Thereby, the molten resin material, which flows toward the projection 172 of the bobbin 171, is released to the outside of the yoke 115, and thereby the molding pressure applied to the projection 172 is reduced.

As discussed above, in the linear solenoid 70 of the eighth embodiment, the through-holes 175 of the bottom portion 74 of the yoke 73 enable the release of the molten resin material, which is directed to the projection 172 of the bobbin 171 at the time of molding the housing 176, to the outside of the yoke 115. Thereby, the pressure, which is applied to the projection 172 of the bobbin 171, can be reduced. As a result, the advantages, which are similar to those of the seventh embodiment, can be achieved.

Ninth Embodiment

Figure 21:
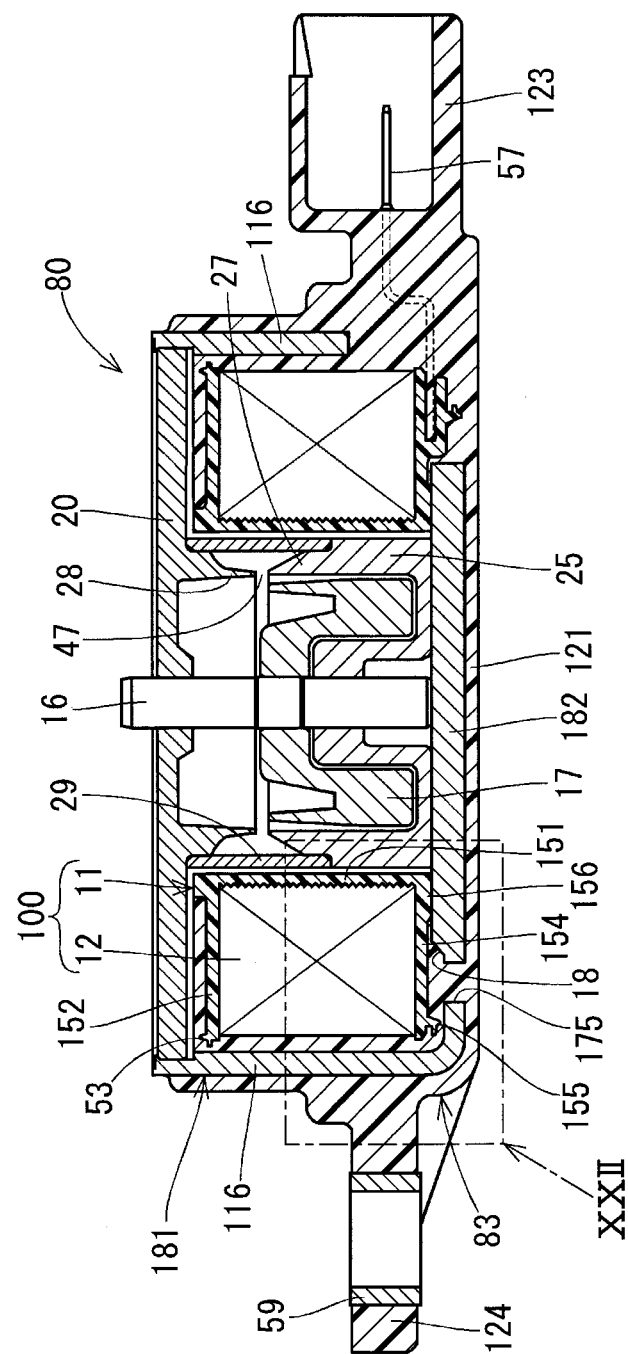
FIG. 21 is a cross-sectional view of a linear solenoid according to a ninth embodiment of the present disclosure.
Figure 22:
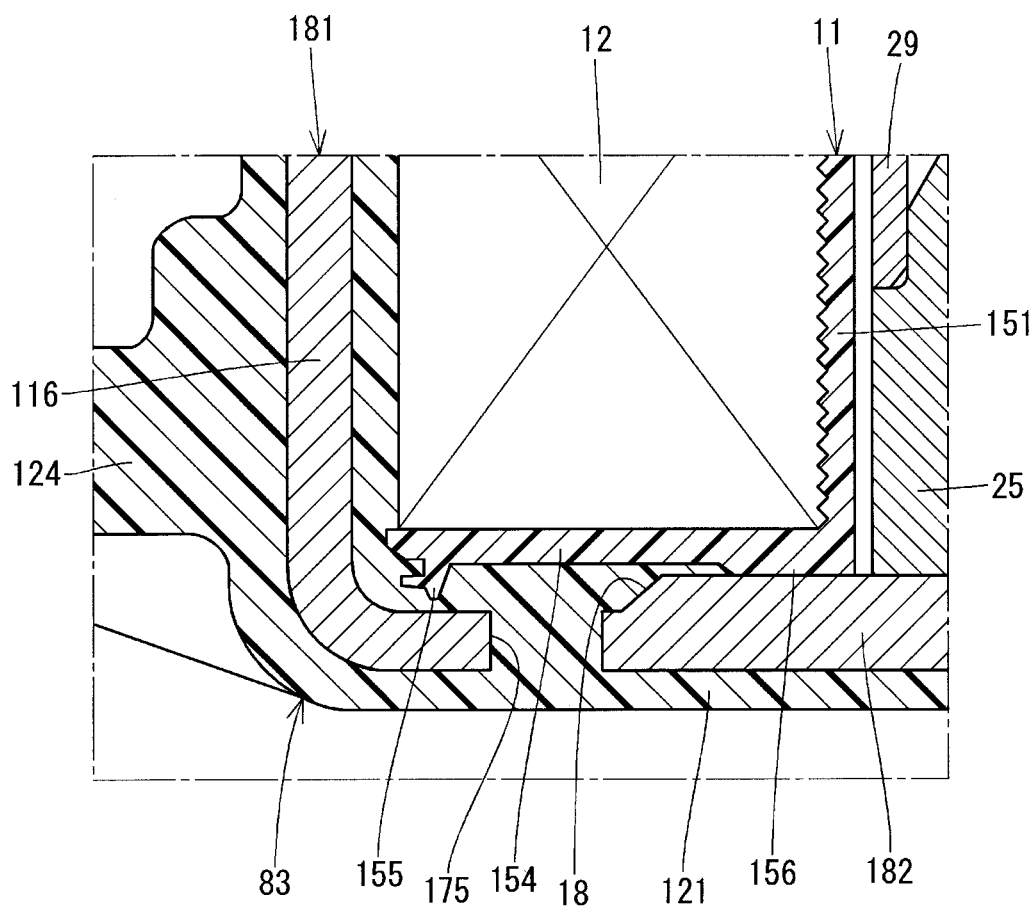
FIG. 22 is a partial enlarged view showing an area XXII in FIG. 21.
Figure 23:
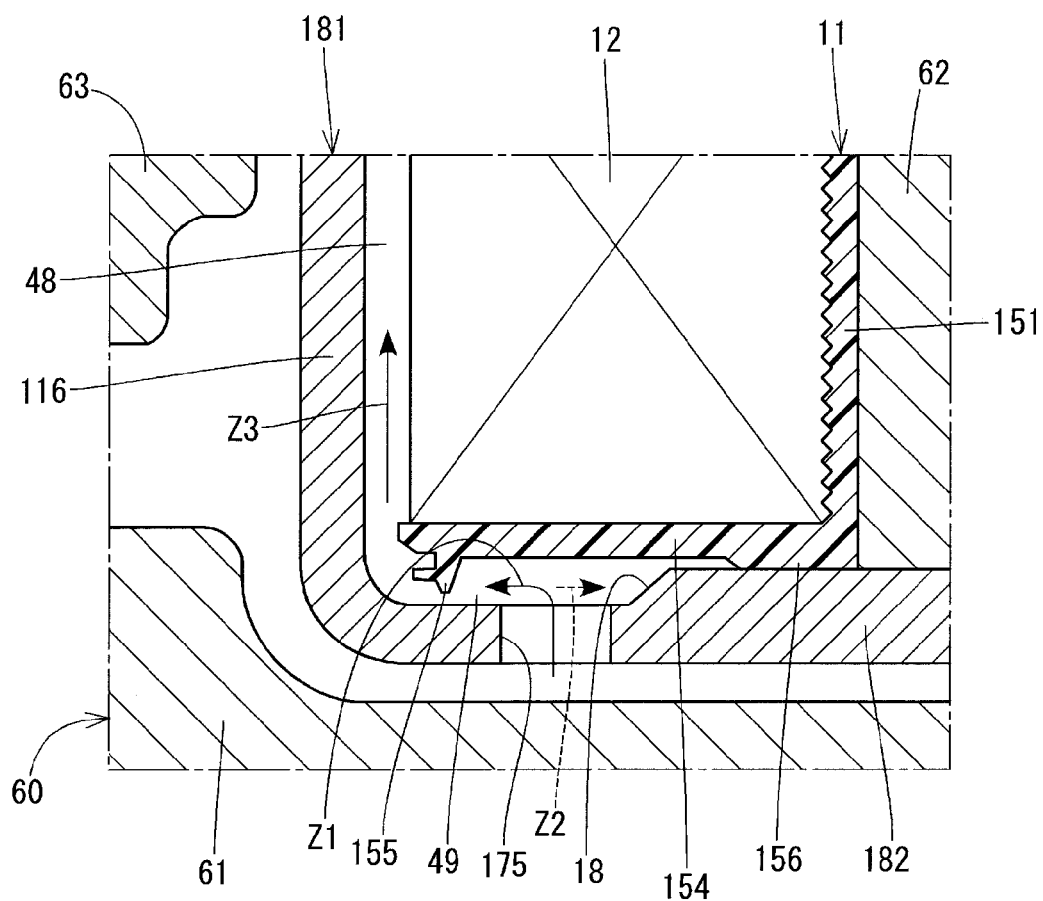
FIG. 23 is a cross-sectional view showing a yoke and a bobbin held in a molding die at the time of resin molding a housing of the linear solenoid shown in FIG. 21.

A linear solenoid according to a ninth embodiment of the present disclosure will be described with reference to FIGS. 21 to 23. The ninth embodiment is a modification of the seventh embodiment.

In the linear solenoid 80, a bottom portion 182 of a yoke 181 has both of the step surface 18 and the through-holes 175.

At the time of molding the housing 83 from the resin material, the molten resin material, which is injected from the nozzle of the molding machine, flows from the gate (not shown) to the outside of the yoke 181. Thereafter, as indicated by an arrow Z1 in FIG. 23, the molten resin material flows to the second gap 49 through the through-holes 175 of the bottom portion 182 of the yoke 181. The molten resin material, which is supplied to the second gap 49, tends to flow to the first gap 48, which forms the larger space, as indicated by an arrow Z3 in FIG. 23 rather than flowing toward the projection 156 of the bobbin 11 in a direction of an arrow Z2 shown in FIG. 23. Thereby, the molten resin material, which flows toward the projection 156 of the bobbin 11, is released to the first gap 48, so that the molding pressure, which is applied to the projection 156, is reduced.

Furthermore, the molten resin material, which flows toward the projection 156 of the bobbin 11 while bypassing the through-holes 175, is applied to the step surface 18. In this way, the molding pressure, which is applied to the projection 156 of the bobbin 11, is further reduced.

As discussed above, according to the ninth embodiment, at the time of molding the housing 200 from the resin material, the radially inward flexion of the projection 156 of the bobbin 11 can be further limited in comparison to the seventh and eighth embodiments. As a result, the formation of burrs from the molding resin material and the formation of cracks of the bobbin 11 caused by the radially inward flexion of the projection 156 can be limited.

Now, modifications of the above embodiments will be described.

The cross-sectional shape of each through-hole of the housing discussed in the first to sixth embodiments is not limited to the circular shape, the oval shape (e.g., the oval track shape or the oblong shape) or the arcuate shape discussed above. In one modification of the above embodiments, the cross-sectional shape of each through-hole of the housing may be changed to any other suitable shape. For example, the cross-sectional shape of each through-hole of the housing may be a rectangular shape, a polygonal shape or the like. Alternatively, a mixture of the above described shapes may be used. That is, it is only required that the through-hole(s) extends through the first molded portion of the housing in the axial direction at the location, which is on the radially inner side of the first fusing protrusion. Also, the through-hole (or the single through hole), which are similar to those of any one of the first to sixth embodiments may be provided in any one of the seventh to ninth embodiments.

In another modification of the above embodiment(s), the through-holes of the housing discussed in the first to sixth embodiments may not be arranged at the equal angular intervals in the circumferential direction. That is, the through-holes of the housing may be arranged at any suitable angular intervals in the circumferential direction. Furthermore, the sizes of the through-holes may be varied from one to another (or may be different from each other).

In another modification of the above embodiment(s), the number of the through-hole(s) of the housing discussed in the first to sixth embodiments may be one.

In another modification of the above embodiment(s), the housing may be a member that is resin molded to hold only the coil and the bobbin. At that time, the housing may be formed by the yoke or may be provided separately from the yoke and the housing.

In another modification of the above embodiment(s), the fixation between the first stationary core and the yoke is not limited to the swaging and may be made by, for example, press-fitting.

In another modification of the above embodiment(s), the first stationary core and the second stationary core may be made by a single common member. It is only required to provide a portion, which has a relatively low magnetic reluctance (magnetic resistance), at a location between the first stationary core and the second stationary core.

In another modification of the above embodiment(s), the liner solenoid is not necessarily implemented as the drive device of the hydraulic pressure change valve and may be implemented as a drive device of various other functional apparatuses, each of which includes a driven member that is driven to reciprocate.

In another modification of the above embodiment(s), the step surface of the bottom portion of the yoke discussed in the seventh and ninth embodiments may be configured into a cylindrical surface such that an outer diameter of the step surface does not change in the axial direction. Alternatively, the step surface may be tapered such that the outer diameter of the step surface progressively increased in the axial direction toward the second flange portion.

In another modification of the above embodiment(s), the through-holes of the bottom portion of the yoke discussed in the eighth and ninth embodiments may not be arranged at generally equal intervals in the circumferential direction. Furthermore, the sizes of the through-holes may be varied from one to another (or may be different from each other). The number of the through-hole(s) of the bottom portion of the yoke may be limited to only one.

In another modification of the above embodiment(s), the magnetic flux may be conducted between the first stationary core and the yoke in the axial direction.

In another modification of the above embodiment(s), it is not necessary to fit the first stationary core into the tubular portion of the yoke. In the case where the first stationary core is not fitted into the tubular portion of the yoke, the fixation between the first stationary core and the yoke may be made by, for example, crimping.

In another modification of the above embodiment(s), the magnetic flux may be conducted between the second stationary core and the yoke in the radial direction. In this case, the second stationary core and the yoke may be fixed together by, for example, press-fitting.

In another modification of the above embodiment(s), the first stationary core may be made from a plurality of members. That is, a bearing portion, which slidably supports the output rod, and a fixing portion, which is fixed to the tubular portion of the yoke, may be formed separately and assembled together to form the first stationary core.

In another modification of the above embodiment(s), the annular projection may be eliminated from at least one of the first stationary core and the second stationary core. That is, it is only required to provide the air gap between the first stationary core and the second stationary core.

In another modification of the above embodiment(s), one or all of the first stationary core, the second stationary core and the yoke may have a cross section that is not circular and may have a notch in a circumferential portion thereof.

In another modification of the above embodiment(s), the collar, which is installed to the first and second stationary cores, may be formed into another form that is other than the tubular form. The configuration of the collar may be, for example, a rod form or a plate form as long as the collar can limit the relative movement of the first stationary core and the second stationary core toward each other.

In another modification of the above embodiment(s), the collar may be engaged with the first stationary core and the second stationary core rather than using the press-fitting. In this way, the collar does not need to integrally assemble the first stationary core, the second stationary core, the output rod and the movable core.

The present disclosure is not limited the above embodiments and modifications thereof. That is, the above embodiments and modifications thereof may be modified in various ways without departing from the spirit and scope of the present disclosure.

What is claimed is:

1. A linear solenoid comprising:
   a mover that is elongated in an axial direction and is configured to reciprocate in the axial direction;
   a stator that axially slidably supports the mover;
   a yoke that includes:
      a tubular portion, which is located on a radially outer side of the stator and contacts one end portion of the stator; and
      a bottom portion, which contacts the other end portion of the stator, which is opposite from the one end portion of the stator in the axial direction;
   a coil that is configured into an annular shape and is placed between the tubular portion of the yoke and the stator;
   a bobbin that includes:
      a winding portion, which is configured into a tubular shape and holds the coil that is wound around the winding portion;
      a first flange portion, which is placed at one end part of the winding portion, which is opposite from the bottom portion in the axial direction; and
      a second flange portion, which is placed at the other end part of the winding portion that is opposite from the one end part of the winding portion in the axial direction; and
   a molded member that is made of a resin material and holds the coil, the first flange portion and the second flange portion of the bobbin, which are insert-molded in the molded member, wherein:
   the first flange portion of the bobbin forms a fusing protrusion, which is joined and fused with the molded member; and
   the molded member includes at least one through-hole, which is located on a radially inner side of the fusing protrusion and extends through a portion of the molded member in the axial direction.

2. The linear solenoid according to claim 1, wherein the at least one through-hole includes a plurality of through-holes, which are arranged at generally equal angular intervals in a circumferential direction.

3. The linear solenoid according to claim 1, wherein the at least one through-hole is placed at a radially outer part of the first flange portion.

4. The linear solenoid according to claim 1, wherein the linear solenoid is a drive device installed in a valve timing control apparatus, which adjusts valve timing of one of an intake valve and an exhaust vale of an internal combustion engine.

5. A linear solenoid comprising:
   an output rod;
   a first stationary core that supports one end portion of the output rod;
   a second stationary core that supports the other end portion of the output rod, which is opposite from the one end portion of the output rod in an axial direction of the output rod, wherein an air gap is interposed between the first stationary core and the second stationary core in the axial direction;
   a movable core that is fixed to the output rod and is configured to reciprocate in the axial direction between an initial position, which is located on a side where the second stationary core is placed, and a full stroke position, which is located on a side where the first stationary core is placed;
   a coil that is formed into an annular form and is located on a radially outer side of the air gap;
   a bobbin that includes:
      a winding portion, which is configured into a tubular form, wherein the coil is wound around the winding portion;
      a first flange portion, which radially outwardly extends from one end part of the winding portion;
      a first fusing protrusion, which is formed in a radially outer end part of the first flange portion;
      a second flange portion, which radially outwardly extends from the other end part of the winding portion that is opposite from the one end part of the winding portion in the axial direction;
      a second fusing protrusion, which is formed in a radially outer end part of the second flange portion; and
      a projection, which projects from the winding portion in the axial direction;
   a first yoke that is located on a radially outer side of the coil, wherein the first yoke is configured to conduct a magnetic flux between the first yoke and the first stationary core;
   a second yoke that is placed adjacent to the projection of the bobbin and the second stationary core on a side, which is opposite from the first stationary core in the axial direction, wherein the second yoke magnetically couples between the first yoke and the second stationary core; and
   a housing that is molded from a resin material, which fills:
      a radial gap that is radially defined between the first yoke, which is located on a radially outer side of the radial gap, and the coil and the bobbin, which are located on a radially inner side of the radial gap; and
      an axial gap that is axially defined between the second yoke, which is located on an axially outer side of the axial gap, and the second flange portion of the bobbin, which is located on an axially inner side of the axial gap, wherein:
   the housing is joined and fused with the first fusing protrusion and the second fusing protrusion of the bobbin; and
   the second yoke includes at least one pressure reducing part, which is configured to reduce a pressure exerted to the projection of the bobbin by a flow of the resin material at a time of molding the housing.

6. The linear solenoid according to claim 5, wherein the at least one pressure reducing part includes a step surface, which is located on a radially outer side of the projection of the bobbin.

7. The linear solenoid according to claim 5, wherein the at least one pressure reducing part includes at least one through-hole, which extends through the second yoke in the axial direction at a corresponding location that is on a radially outer side of the projection of the bobbin.

8. The linear solenoid according to claim 5, wherein the at least one pressure reducing part includes:
   a step surface, which is located on a radially outer side of the projection of the bobbin; and
   at least one through-hole, which extends through the second yoke in the axial direction at a corresponding location that is on a radially outer side of the projection of the bobbin.

9. The linear solenoid according to claim 5, wherein the first yoke and the second yoke are formed integrally to form a cup shape member.

10. The linear solenoid according to claim 5, wherein the housing includes:
   a main body, in which the first yoke, the second yoke, the coil and the bobbin are insert molded;
   a connector portion, which receives a plurality of terminals connected to the coil; and
   at least one bracket portion, which is installable to an external support.

* * * * *